United States Patent
Ito

(10) Patent No.: US 6,802,413 B2
(45) Date of Patent: Oct. 12, 2004

(54) HANGING CONVEYANCE EQUIPMENT AND LEARNING SYSTEM THEREFOR

(75) Inventor: Kenji Ito, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 46 days.

(21) Appl. No.: 10/274,458

(22) Filed: Oct. 18, 2002

(65) Prior Publication Data

US 2003/0075415 A1 Apr. 24, 2003

(30) Foreign Application Priority Data

Oct. 19, 2001 (JP) .......................................... 2001-321790

(51) Int. Cl.[7] .............................................. B65G 29/00
(52) U.S. Cl. ................................ 198/465.1; 198/678.1; 198/680; 198/687
(58) Field of Search .......................... 198/465.1, 678.1, 198/680, 687, 82; 414/940

(56) References Cited

U.S. PATENT DOCUMENTS

| | | | | |
|---|---|---|---|---|
| 4,513,682 A | * | 4/1985 | Otocki ........................ | 118/322 |
| 5,150,624 A | * | 9/1992 | Kaczmarek et al. ........ | 73/865.9 |
| 5,506,682 A | * | 4/1996 | Pryor ......................... | 356/623 |
| 5,570,990 A | * | 11/1996 | Bonora et al. ............... | 414/543 |
| 5,628,604 A | * | 5/1997 | Murata et al. ............... | 414/283 |
| 5,668,452 A | * | 9/1997 | Villarreal et al. ....... | 318/568.16 |
| 6,247,597 B1 | * | 6/2001 | Sato ............................ | 206/710 |
| 6,427,824 B1 | * | 8/2002 | Murata et al. ............... | 198/348 |
| 6,530,466 B2 | * | 3/2003 | Murata et al. ........... | 198/465.4 |

* cited by examiner

*Primary Examiner*—Douglas Hess
(74) *Attorney, Agent, or Firm*—Goodwin Procter LLP

(57) ABSTRACT

Hanging conveyance equipment according to the present invention comprises a carriage, a number of work supports and a work hand. The carriage travels along a horizontal travelling path, which has stop positions arranged along it. Each of the work supports is fixed below one of the stop positions. An amount of work-lifting positioning and an amount of work-lowering positioning are set for each of the work supports. The work hand can hold a work W hanging from it. The work hand is supported by the carriage in such a manner that the work hand can be positioned horizontally two-dimensionally with respect to the carriage. The work hand can vertically move with respect to the carriage to load a work onto or unload a work from each of the work supports. When the work hand is lowered from the carriage in each of the stop positions to lift a work from the associated work support, the work hand is positioned horizontally two-dimensionally in accordance with the amount of work-lifting positioning for the support. When the work hand is lowered from the carriage in each of the stop positions to lower a work onto the associated work support, the work hand is positioned horizontally two-dimensionally in accordance with the amount of work-lowering positioning for the support.

22 Claims, 16 Drawing Sheets

(A)

(B)

(A)

(B) (C)

HANGING CONVEYANCE EQUIPMENT AND LEARNING SYSTEM THEREFOR

FIELD OF THE INVENTION

The present invention relates to hanging conveyance equipment and a learning system for learning operating conditions of the equipment in advance.

PRIOR ART

Japanese Unexamined Patent Publication No. H11-349280 discloses conventional hanging conveyance equipment. This equipment includes a carriage fitted with a work hand, which can move vertically and be positioned horizontally two-dimensionally with respect to it. The work hand can hold a work and move vertically with the work hanging from it. The carriage can run along a path, below which a number of work supports are arranged. The work hand can load and unload each of the work supports.

In this type of hanging conveyance equipment, the carriage can be stopped accurately in the stop position set above each of the work supports. However, if the work supports are installed or fixed at different degrees of accuracy, the work hand of the carriage in each of the stop positions is displaced with respect to the associated work support laterally and/or angularly around a vertical axis. When a work is lowered onto each the work supports, and when the work on each of the work supports is lifted, the position of the work hand may need to be highly precise. In this case, as disclosed in the foregoing publication, amounts of horizontal two-dimensional positioning for the work hand can be preset for each of the work supports. When the work hand is lowered from the carriage in the stop position for the work support, the work hand can be positioned horizontally two-dimensionally with the associated amounts of positioning.

Specifically, in Japanese Unexamined Patent Publication No. H11-349280, with the carriage in the stop position above each of the work supports, the amounts of horizontal two-dimensional displacement of the work hand with respect to the work support are detected. On the basis of the detected amounts, amounts of positioning for the work hand are set for the work support. Accordingly, both when the work on each of the work supports is lifted to be conveyed from it, and when a work is lowered to be supplied to each the work supports, the work hand is positioned with respect to the carriage only on the basis of the associated amounts of positioning.

In this type of hanging conveyance equipment, the work hand is hung from the carriage by belts that can be extended and taken up. It is possible to lift the work on each of the work supports by lowering the empty work hand to a position where the hand can hold the work. The lowered empty hand may be in a horizontal position. It is possible to lower a work with the work hand by lowering the hand to a position where the load can be unloaded. The lowered work hand holding the work may be inclined because of various factors, such as a shift of the center of gravity of the work, different amounts of extension of the belts, and low producing accuracy of the head of the work. The heads of all works may be inclined uniformly and low in producing accuracy accordingly. The inclination of the work hand leads to horizontal two-dimensional displacement of the hand with respect to the work support. It is consequently impossible to lower the work accurately to a predetermined position on the work support only by positioning the work hand with the same amounts when the work is lifted and when the work is lowered.

SUMMARY OF THE INVENTION

The object of the present invention is to provide hanging conveyance equipment that can load and unload works safely and accurately by solving the foregoing conventional problem.

According to a first aspect of the present invention, hanging conveyance equipment is provided, which comprises a carriage, a number of work supports and a work hand. The carriage travels along a horizontal travelling path, which has stop positions arranged along it. Each of the work supports is fixed below one of the stop positions. An amount of work-lifting positioning and an amount of work-lowering positioning are set for each of the work supports. The work hand can hold a work hanging from it. The work hand is supported by the carriage in such a manner that the work hand can be positioned horizontally two-dimensionally with respect to the carriage. The work hand can vertically move with respect to the carriage to load a work onto or unload a work from each of the work supports. When the work hand is lowered from the carriage in each of the stop positions to lift a work from the associated work support, the work hand is positioned horizontally two-dimensionally in accordance with the amount of work-lifting positioning for the support. When the work hand is lowered from the carriage in each of the stop positions to lower a work onto the associated work support, the work hand is positioned horizontally two-dimensionally in accordance with the amount of work-lowering positioning for the support.

The work supports may be fixed at low or different degrees of accuracy with respect to the horizontal travelling path, along which the carriage travels. In such a case, when the work hand is lowered to a position over each of the work supports to load or unload the support, the hand might otherwise be displaced horizontally two-dimensionally with respect to a fixed position on the support. The displacement would make it impossible to place a work in the fixed position on the work support, or to normally lift a work supported in the fixed position.

As stated already, an amount of work-lifting positioning and an amount of work-lowering positioning are set for each of the work supports. When the work hand is lowered from the carriage in each of the stop positions to lift a work from the associated work support, the work hand is positioned horizontally two-dimensionally in accordance with the amount of work-lifting positioning for the support. When the work hand is lowered from the carriage in each of the stop positions to lower a work onto the associated work support, the work hand is positioned horizontally two-dimensionally in accordance with the amount of work-lowering positioning for the support. There may be a case where the empty work hand is lowered to a position over one of the work supports to lift a work from the support, and where the work hand holding a work is lowered to a horizontally two-dimensionally different position over the same support. Even in this case, the work hand can be lowered safely and securely or reliably.

After the empty work hand is lowered, it can hold a work and then be lifted without problems. When the work hand holding a work is lowered so that the work can be placed on each of the work supports, the hand and work may be inclined due to various factors as stated earlier. The inclination would otherwise displace the work horizontally two-dimensionally with respect to the work support. However, the work hand is positioned in accordance with the associated amount of work-lowering positioning so that the inclined work can be placed accurately in the fixed position on the work support.

The amount of work-lowering positioning for each of the work supports may be the associated amount of work-lifting positioning corrected with an amount of correction equivalent to the error between the position of the work hand holding a work and lowered to a predetermined height over the work support and the position of the hand lowered to the height without holding a work. This obviates the need to find both the amount of work-lifting positioning and the amount of work-lowering positioning for each of the work supports by a learning process or the like. Consequently, the time and labor required for the learning process etc. are reduced, and it is easy to operate the conveyance equipment.

The work hand may be positioned with respect to the carriage in parallel with the horizontal travelling path, laterally at right angles to the path and angularly around a vertical axis. In practice, however, if the carriage can stop accurately in the stop positions, the work hand does not need to be positioned in parallel with the travelling path. In other words, practically, the work hand may be positioned with respect to the carriage only laterally at right angles to the travelling path and angularly around the vertical axis. This simplifies the structure of the work hand positioner necessary for the carriage and facilitates the positioning control.

The hanging conveyance equipment needs to learn an amount of horizontal two-dimensional displacement of the work hand relative to each of the work supports at the time when the carriage stops in the associated stop position. The learned amount of displacement is the basis for setting the associated amounts of work-lifting positioning and work-lowering positioning.

According to a second aspect of the present invention, there is provided a learning system suitable for such learning. The learning system can be used with the hanging conveyance equipment to learn an amount of horizontal two-dimensional displacement of the work hand with respect to each of the work supports at the time when the carriage is in the associated stop position. The learning system comprises a first jig, a second jig and a means of displacement operation. The first jig can be placed in the fixed positions on the work supports and has a fixed position on it. The second jig can be placed in the fixed position on the first jig and includes a held part for engaging with the work hand to be held by it. One of the jigs includes a detected part. The other jig includes a detector for detecting the horizontal two-dimensional position of the detected part to find reference position data for the detected part with the second jig placed in the fixed position on the first jig and comparative position data for the detected part with the second jig held by the work hand of the carriage in each the stop positions and lowered onto the first jig. The means of displacement operation finds an amount of horizontal two-dimensional displacement of the work hand with respect to each of the work supports from the reference position data and the associated comparative position data.

The learning system makes it possible to detect the necessary amounts of displacement accurately and easily only by means of the two jigs without providing a special detected part and a special detector for learning on the work hand and the existing work supports.

The amount of displacement for each of the work supports is detected with the second jig held by the work hand and placed on the first jig set on the work support. Consequently, in comparison with a case where the displacement of the work hand would otherwise be detected with the hand in its top (home) position over the work support, the learning system makes the detection reliable even if, when the work hand is lowered, it inclines due to different amounts of extension of the belts with which the hand hangs. This makes it possible to detect amounts of displacement that can be used to set amounts of positioning fit for loading and unloading operations, which are performed by actually lowering the work hand.

In practice, as stated earlier, the work hand does not need to be positioned in parallel with the horizontal travelling path if the carriage can stop accurately in the stop positions. Consequently, the amount of horizontal two-dimensional displacement of the work hand found for each of the work supports by the means of displacement operation (the operation/recording/transmission processor 56 in the embodiment of the invention) may consist of an amount of lateral displacement of the hand at right angles to the travelling path and an amount of angular displacement of the hand around a vertical axis.

The detector may be an image pickup camera fitted to the first jig and facing upward. The detected part may be a mark placed on the second jig near the held part and facing downward. The first jig to which the camera is fitted can be set on each of the work supports. The second jig on which the mark is placed can be held by the work hand and vertically moved. In this case, as compared with a case where the camera would otherwise be fitted to the second jig and where the mark would otherwise be placed on the first jig, the wiring between the camera and the means of displacement operation is easy, and the camera is safe against damage. If the mark is placed on the second jig near the held part, which can be held by the work hand, the displacement detection is accurate. The first jig to which the camera is fitted can be used for a process of learning amounts of work-lowering correction, as stated in the embodiment of the invention.

The first jig may be fitted with a number of removable positioning pins on its top. The second jig may be formed with positioning holes in its bottom, each of which can engage with one of the pins. This improves the positional accuracy of the second jig in the detection of reference position data. However, this exerts no influence on the position of the second jig when this jig is held by the work hand and placed on the first jig in the detection of comparative position data. Consequently, the displacement detection is accurate.

Before operating the hanging conveyance equipment, it is necessary to find the amounts of work-lowering positioning by means of a second learning system for finding an amount of horizontal two-dimensional displacement of the work hand lowered with a work.

The horizontal travelling path may further have a tentative stop position set in it. The second learning system may include a tentative port for exclusive use with a learning process for finding an amount of work-lowering correction. The tentative port is fixed below the tentative stop position. The tentative port has a fixed position set on it at the same height as the fixed positions of the work supports are set. A learning work can be placed in this fixed position and is fitted with a detected part on its bottom. The tentative port is fitted with a second detector under its fixed position for detecting the detected part of the learning work. The second learning system may further include a second means of displacement operation for finding, from reference position data obtained by the second detector detecting the detected part of the learning work placed in the fixed position on the tentative port and comparative position data obtained by the second detector detecting the detected part of the learning work held by the work hand of the carriage in the tentative stop position, an amount of horizontal two-dimensional displacement of the work hand lowered with the learning work.

The second learning system makes it possible to easily and accurately perform the learning process for finding an amount of work-lowering correction. The costs of this learning system can be reduced if it includes the first jig fitted with the detector, which may be an image pickup camera, for use with the learning process performed for each of the work supports, as stated in the embodiment of the invention.

Actual or practical hanging conveyance equipment according to the present invention includes a number of carriages 5 supported movably along a horizontal path. This equipment also includes work hands 8 each supported by one of the carriages 5 vertically and horizontally movably with respect to it. The equipment further includes a number of work supports 3 fixed below the horizontal path.

According to a third aspect of the present invention, there is provided a learning method suitable for this hanging conveyance equipment. The learning method comprises the steps of:

choosing a reference carriage 5S from the carriages 5 and a reference work support 3S from the work supports 3;

performing a first learning process for finding a first amount of horizontal two-dimensional positioning for the work hand 8 of the reference carriage 5S with respect to each of the work supports 3;

storing the first amounts of positioning with respect to the work supports 3 as unified amounts of positioning in the carriages 5 other than the reference carriage 5S;

performing a second learning process for finding a second amount of horizontal two-dimensional positioning for the work hand 8 of each carriage with respect to the reference work support 3S;

performing a comparison operation of the unified and second amounts of positioning for each of the carriages 5 to find an amount of correction exclusive to each of the carriages 5 and common to all of the work supports 3; and correcting the unified amount of positioning for each of the work supports 3 with the amount of correction.

The learning method obviates the need to perform learning processes for all of the carriages with respect to each of the work supports. Even if the carriages differ in producing accuracy, the learning method makes it possible to very accurately set an amount of positioning for the work hand of each of the carriages with respect to each of the work supports.

Other characteristics and/or features of the present invention will be understood easily from the following description of preferred embodiments of the invention with reference to the accompanying drawings.

PREFERRED EMBODIMENTS OF THE INVENTION

Figure 1:
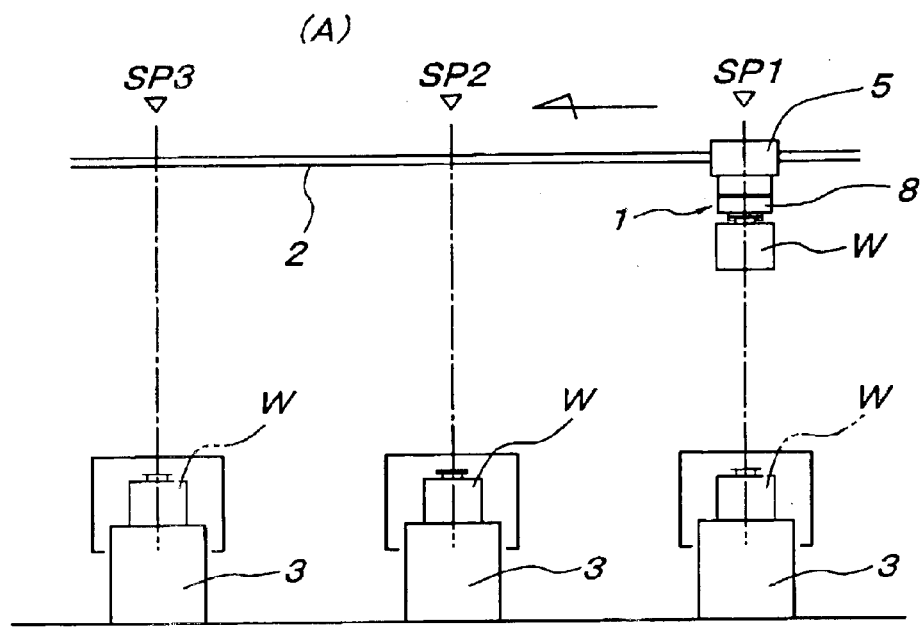
FIGS. 1A and 1B are a schematic side view and a schematic top plan respectively of hanging conveyance equipment embodying the present invention.
Figure 1:
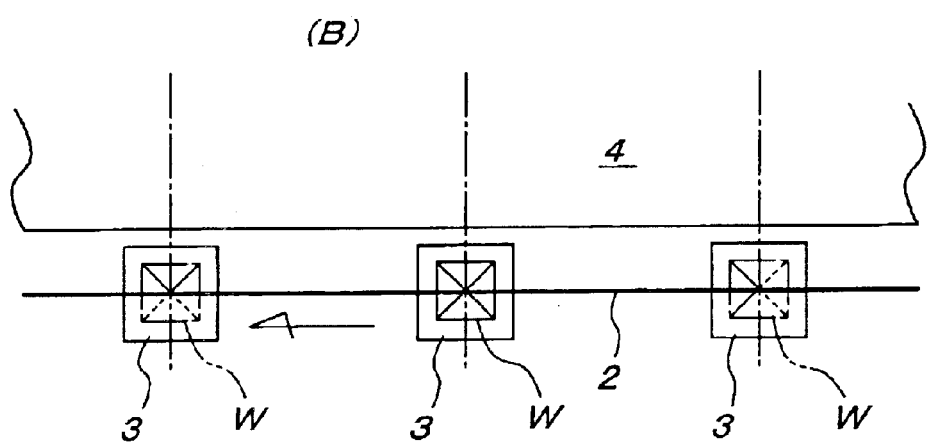
Figure 2:
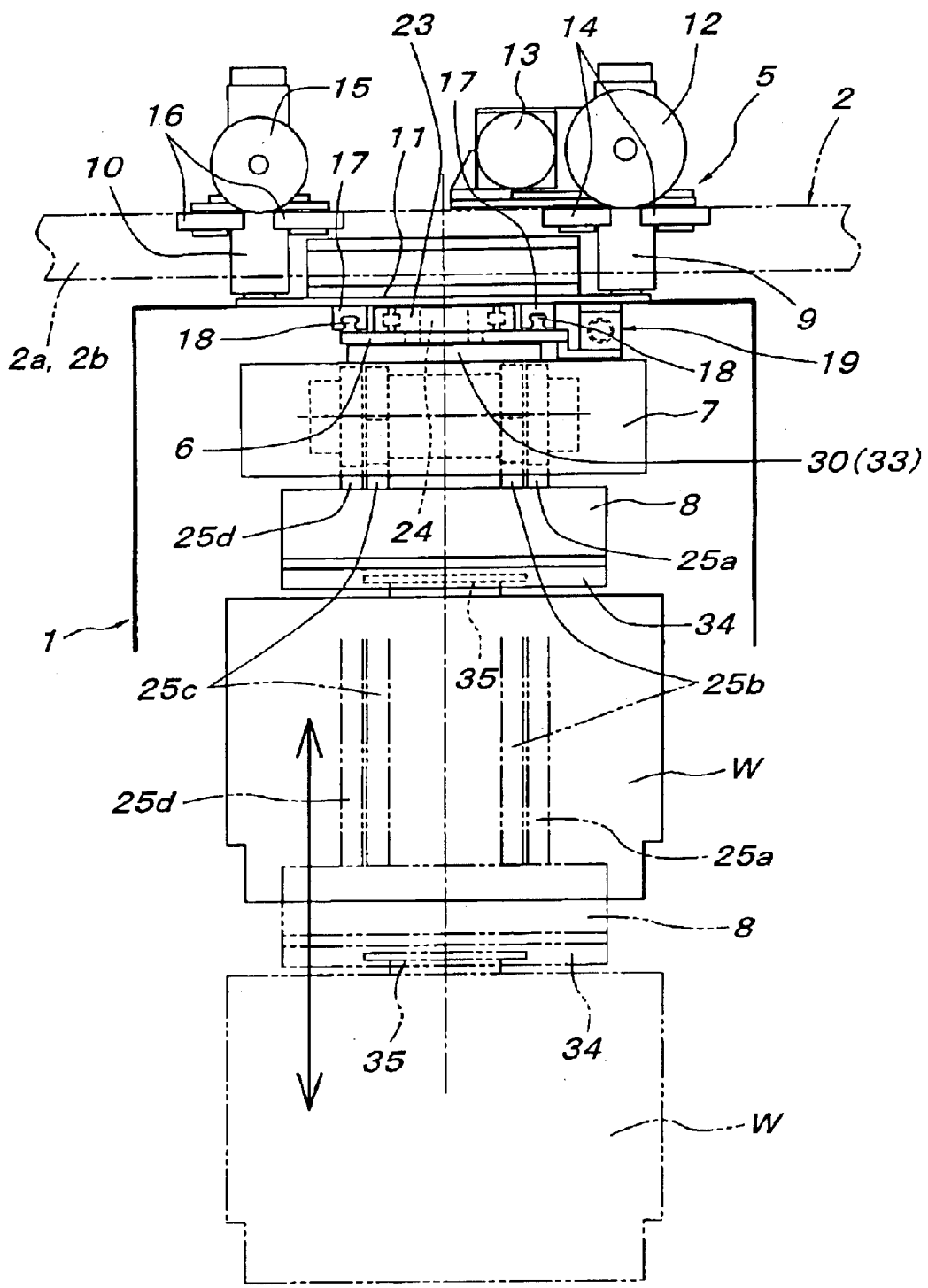
FIG. 2 is a side view of a hanging conveyor of the conveyance equipment.
Figure 3:
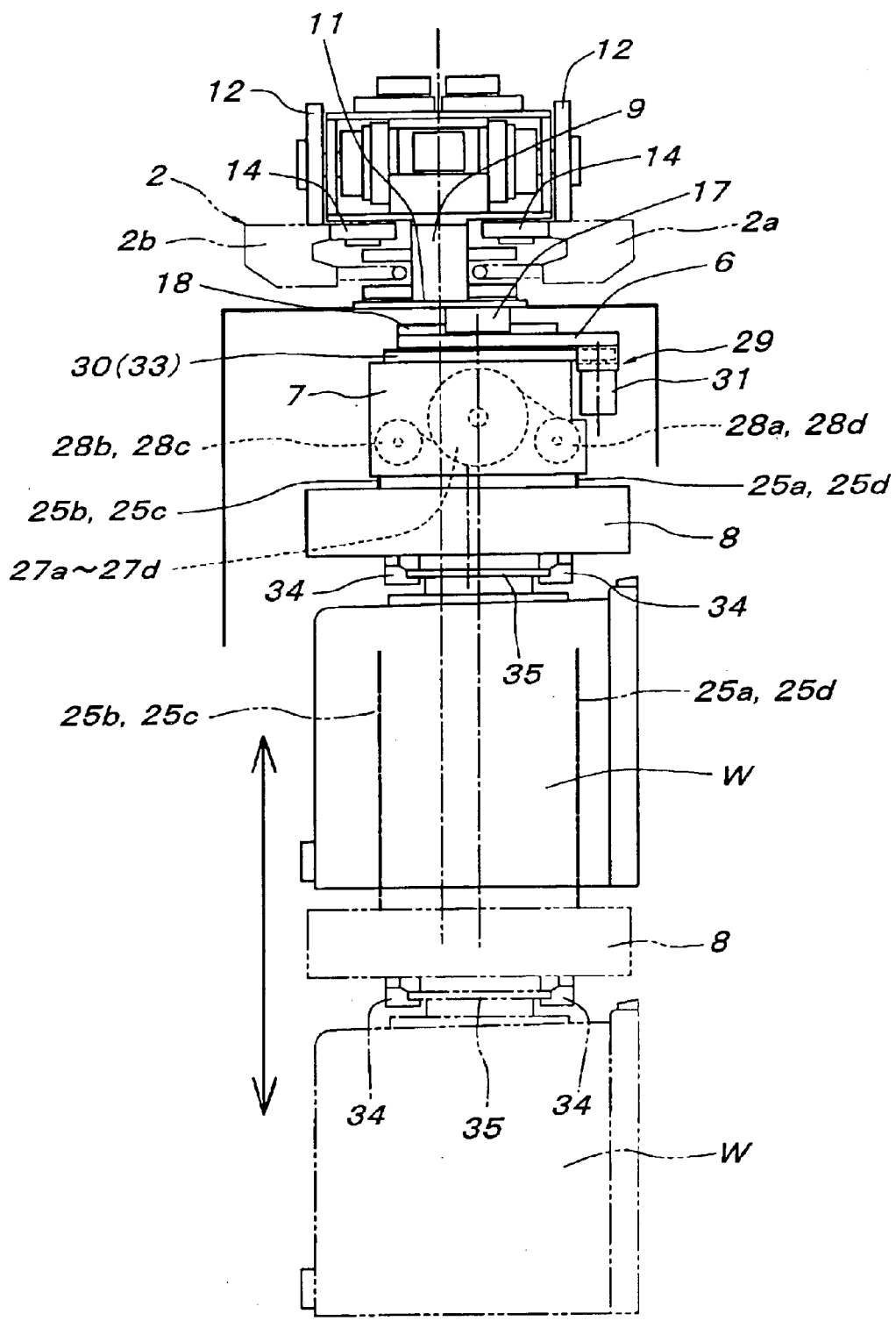
FIG. 3 is a front view of the hanging conveyor.
Figure 4:
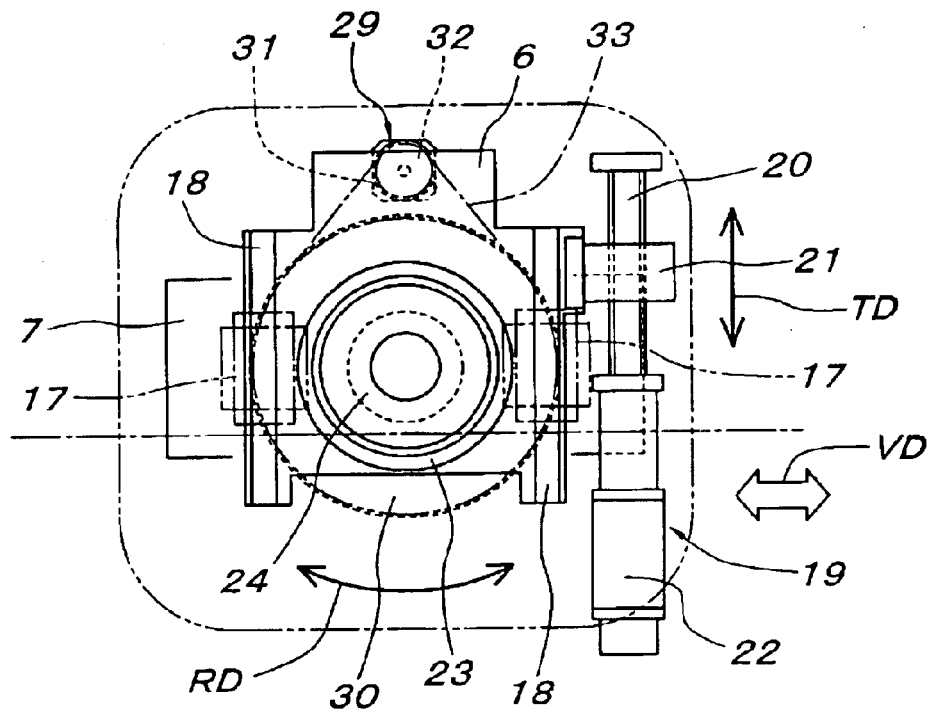
FIG. 4 is a top plan of main parts of the hanging conveyor, showing the positioner for the work hand of the hanging conveyor.
Figure 5:
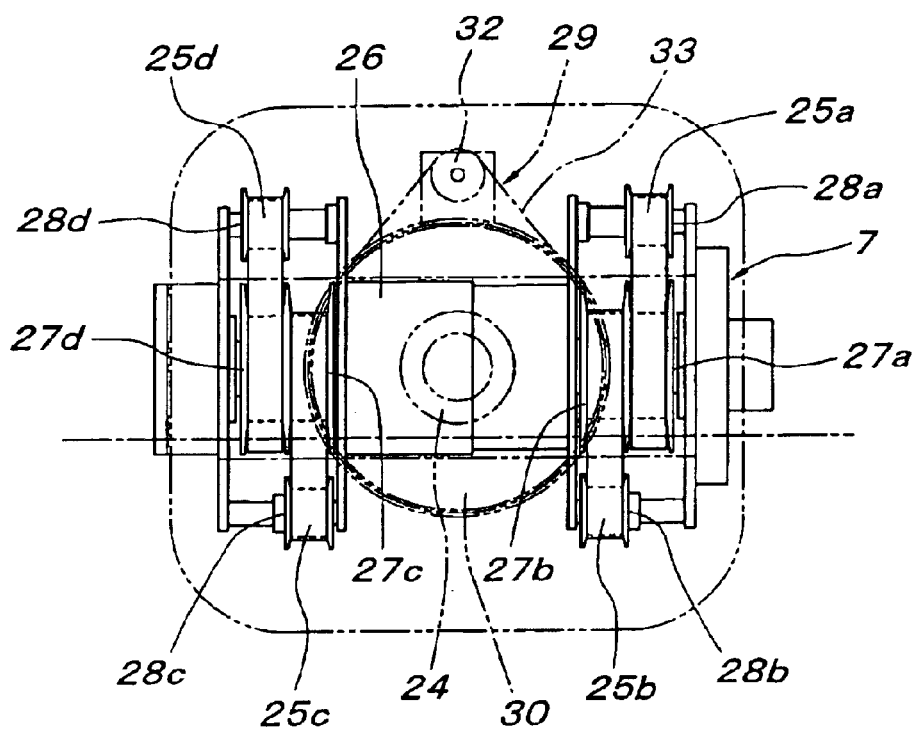
FIG. 5 is a top plan of main parts of the hanging conveyor, showing the vertical drive unit for the work hand.

With reference to FIG. 1, hanging conveyance equipment embodying the present invention includes a number of hanging conveyors 1, one of which is shown, and each of which takes the form of an electric car (railcar). The hanging conveyors 1 are supported by and self-propelled along a pair of parallel guide rails 2 (2a and 2b). The guide rails 2 extend horizontally through a travelling path, along which the hanging conveyors 1 travel. The travelling path extends horizontally in travelling directions VD (FIG. 4) over a floor and adjoins work treatment (processing) equipment 4. A number of ports (work tables or supports) 3 are arranged on the floor at intervals below and along the travelling path. Each of the hanging conveyors 1 can place an untreated work W on any selected port 3, from which an automatic transferrer (not shown) carries the work W into the treatment equipment 4. After treated in the treatment equipment 4, the work W is carried from it by an automatic transferrer (not shown) onto any selected port 3, from which the hanging conveyor 1 can convey the work to another place. While loading or unloading each port 3, the hanging conveyor 1 stops in the stop position SPn (SP1, SP2, SP3 or the like) set above the port 3.

With reference to FIGS. 2–5, the hanging conveyor 1 consists of a carriage 5, a lateral positioning slider 6, a vertical drive unit 7 and a square or rectangular work hand 8. The carriage 5 includes a drive trolley 9, a driven trolley 10 and a main body 11, which connects the trolleys together. The drive trolley 9 includes a pair of horizontal-axis drive wheels 12, a drive motor 13 and two pairs of vertical-axis stabilizing rollers 14. The driven trolley 10 includes a pair of horizontal-axis idle wheels 15 and two pairs of vertical-axis stabilizing rollers 16. Each of the guide rails 2 supports one of the drive wheels 12 and one of the idle wheels 15, with one pair of stabilizing rollers 14 and one pair of stabilizing rollers 16 in contact with the rail 2.

The main body 11 of the carriage 5 is fitted with a pair of horizontal slide guides 17 on its underside, which extend at right angles to the guide rails 2. The lateral positioning slider 6 includes a pair of horizontal slide rails 18, each of which engages slidably with one of the slide guides 17. Thus, the slider 6 is supported slidably relative to the carriage 5 in the lateral directions TD (FIG. 4) at right angles to the guide rails 2. A lateral driver 19 is interposed between the carriage body 11 and the slider 6 and consists of a horizontal screw shaft 20, an internally threaded part 21 and a motor 22. The screw shaft 20 is supported by the carriage body 11 and extends on its underside in the lateral directions TD. The threaded part 21 is fixed to the slider 6 and in engagement with the screw shaft 20. The motor 22 rotates the screw shaft 20 in opposite directions. The rotation of the screw shaft 20 drives the threaded part 21 so as to position the slider 6 in the lateral directions TD.

The lateral positioning slider 6 is fitted with a thrust bearing 23 on its top. The bearing 23 supports a vertical turning shaft 24, which extends on a vertical axis C (FIG. 6D) through the slider 6. The vertical drive unit 7 is fixed to this shaft 24 and includes four hanging belts 25a–25d, through which the work hand 8 is hung vertically movably. The belts 25a–25d can be extended and taken up by reels 27a–27d respectively, which can be rotated in opposite directions by a motor 26. The belts 25a–25d hang through guide reels 28a–28d respectively. The lower ends of the belts 25a–25d are anchored to the top of the work hand 8 near its corners. The vertical drive unit 7 can be turned by an angular driver 29, which consists of a large-diameter pulley 30, a motor 31, a small-diameter pulley 32 and a timing belt or another endless belt 33. The larger pulley 30 is supported on the top of the vertical drive unit 7 under the slider 6 coaxially with the vertical turning shaft 24. The motor 31 is fixed to the underside of the slider 6 and has a vertical output shaft, to which the smaller pulley 32 is fixed. The belt 33 connects the pulleys 30 and 32 together. The activation of the motor 31 turns the vertical drive unit 7 for any angles in the turning directions RD around the vertical turning shaft 24.

The work hand 8 is fitted with a pair of holders 34 on its underside and a driver in it for moving them horizontally in bilateral symmetry toward and away from each other. Each work W has a flange 35 formed on its top for engaging with the holders 34.

Figure 6:
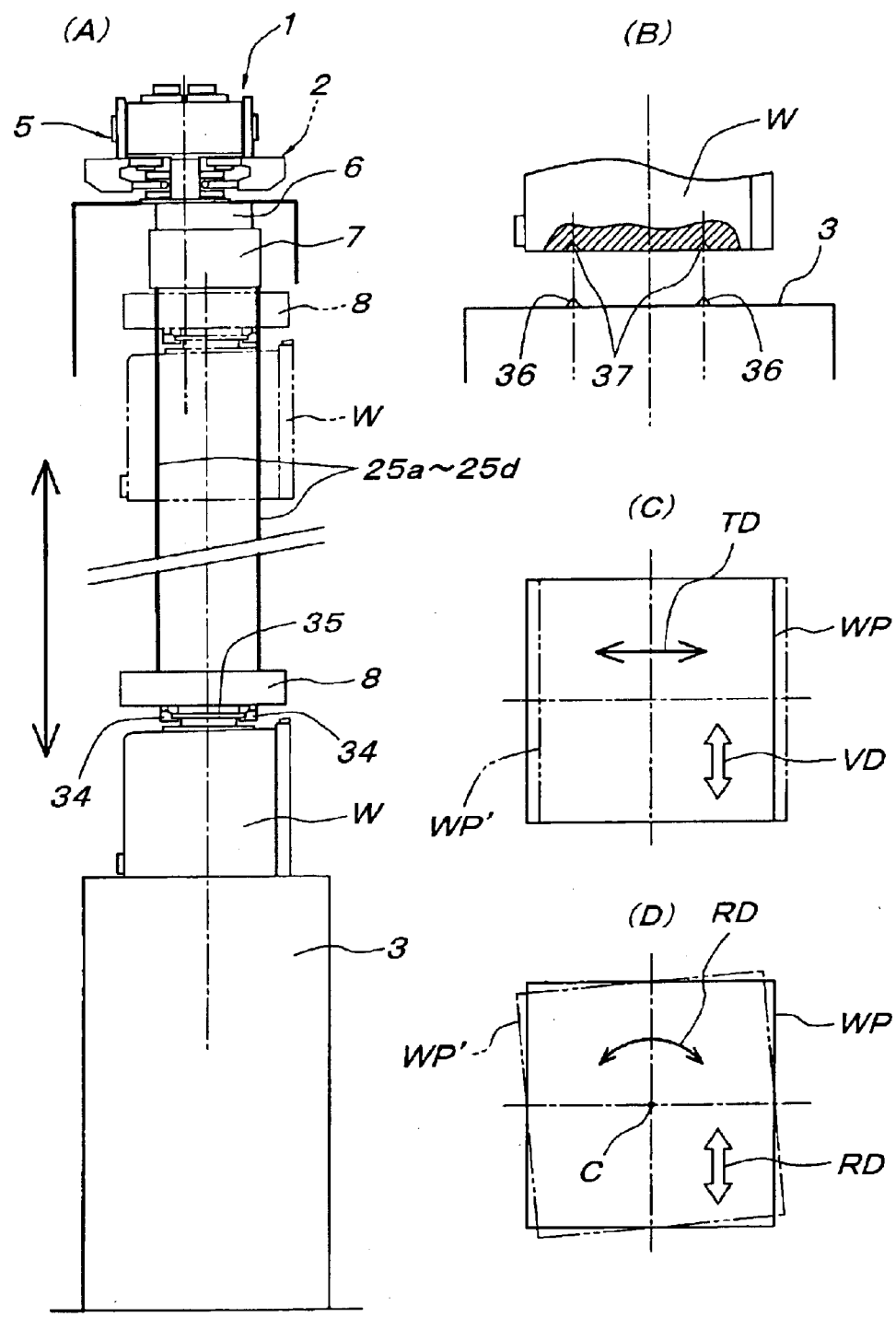
FIG. 6A is a front view of the hanging conveyor loading or unloading a port of the conveyance equipment.
FIG. 6B is a front view partially in vertical section of the port.
FIGS. 6C and 6D are top plans of shifted works.

With reference to FIGS. 1A and 6A, a work W is hung from the hanging conveyor 1, with the top flange 35 held by the work holders 34. The process for lowering, to any one of the ports 3, the work W hung from and conveyed by the hanging conveyor 1 includes the first step of stopping the carriage 5 in the associated stop position SPn. This process also includes the step of extending the hanging belts 25a–25d of the vertical drive unit 7, with the carriage 5 in the stop position SPn, to lower the work hand 8 to a loading position over the port 3 and place the work W on the port 3. The process further includes the step of moving the holders 34 away from each other to release the work W on the port 3. The process includes the final step of taking up the belts 25a–25d to lift the empty work hand 8 to their top (home) positions.

The process for lifting the work W on any one of the ports 3 to convey it to another place by means of the hanging conveyor 1 includes the first step of stopping the carriage 5 in the associated stop position SPn. This process also includes the step of extending the hanging belts 25a–25d of the vertical drive unit 7, with the carriage 5 in the stop position SPn, to lower the work hand 8 to an unloading position over the port 3, with the work holders 34 away from each other. The process further includes the step of moving the holders 34 toward each other to hold the flange 35 of the work W on the port 3. The process includes the final step of taking up the belts 25a –25d to lift the work hand 8 to their top positions, with the work W hanging from the hand 8.

Thus, a work W can be loaded onto and unloaded from each port 3. As shown in FIG. 6B, each port 3 has three (some) conical positioning protrusions 36 formed on its top. As also shown, each work W has three (some) conical positioning recesses 37 in its bottom, each for engaging with one of the protrusions 36. The mutual engagement of the protrusions 36 and recesses 37 positions the work W accurately on the port 3.

If the port 3 is shifted laterally from the travelling path, as shown in FIG. 6C, the fixed position WP of the work W supported on the port 3 may be shifted in one of the lateral directions TD to a position WP' with respect to the work hand 8 of the carriage 5 in the associated stop position SPn. If the port 3 is low in parallelism (degree of parallelization) relative to the travelling path and shifted angularly around the vertical axis C, as shown in FIG. 6D, the fixed position WP of the work W on the port 3 may be shifted in one of the turning directions RD to a position WP' with respect to the work hand 8 of the carriage 5 in the stop position SPn. As a matter of course, the fixed work position WP may be shifted in the lateral and turning directions TD and RD. When the work hand 8 of the carriage 5 in the stop position SPn lowers a work W onto the shifted port 3, the position WP' of the lowered work is displaced from the fixed work position WP on the port 3.

A learning system is used before the ports 3 are loaded and unloaded. The learning system detects the shifts of each port 3 relative to the associated stop position SPn in the lateral directions TD and the turning directions RD around the vertical axis C. In other words, the learning system detects the amounts of displacement of the work hand 8 relative to the fixed position on each port 3 in the lateral and turning directions TD and RD at the time when the hand 8 is lowered from the carriage 5 in the associated stop position SPn.

Figure 7:
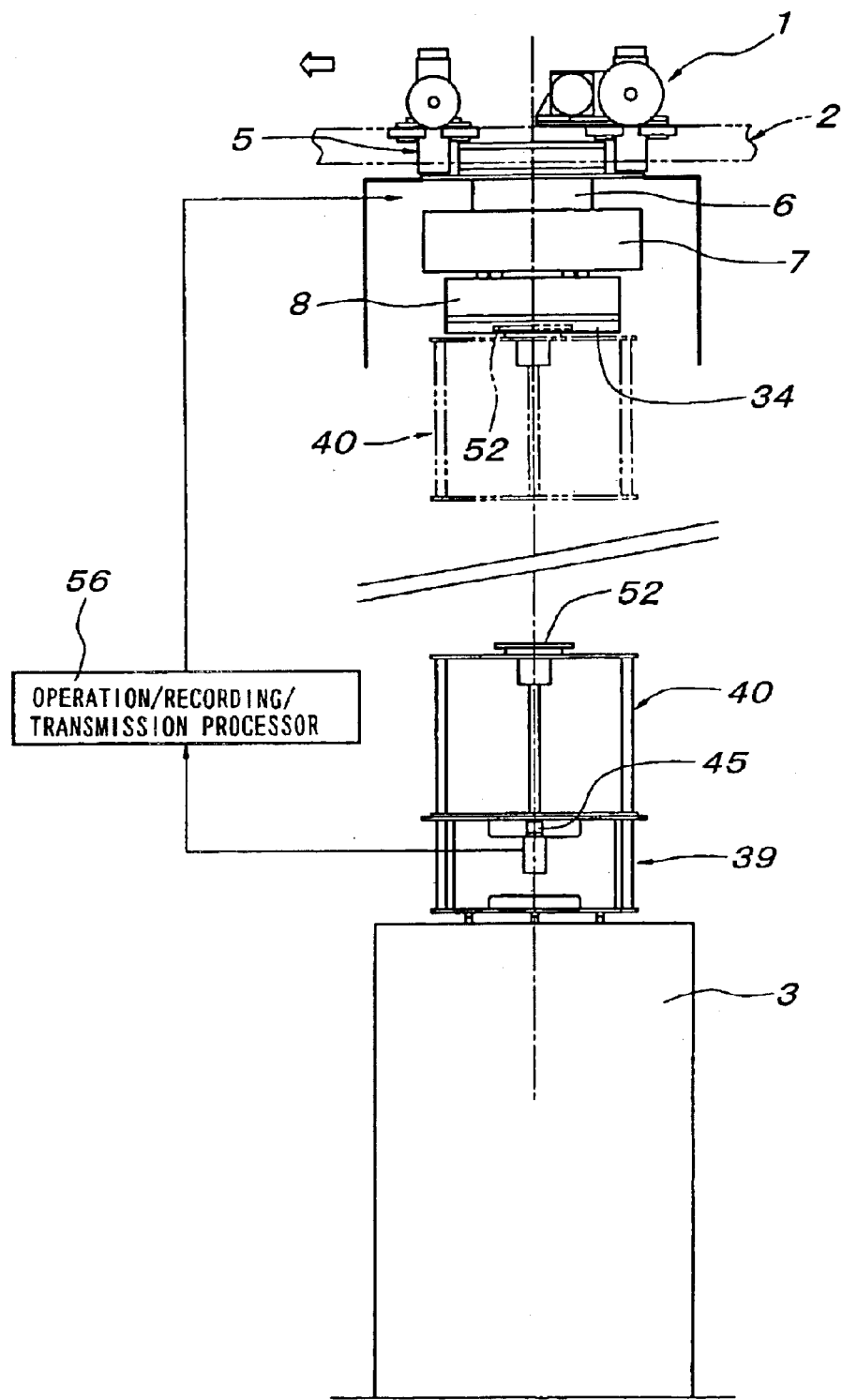
FIG. 7 is a side view of the hanging conveyor, showing the learning process for the detection of displacement.
Figure 8:
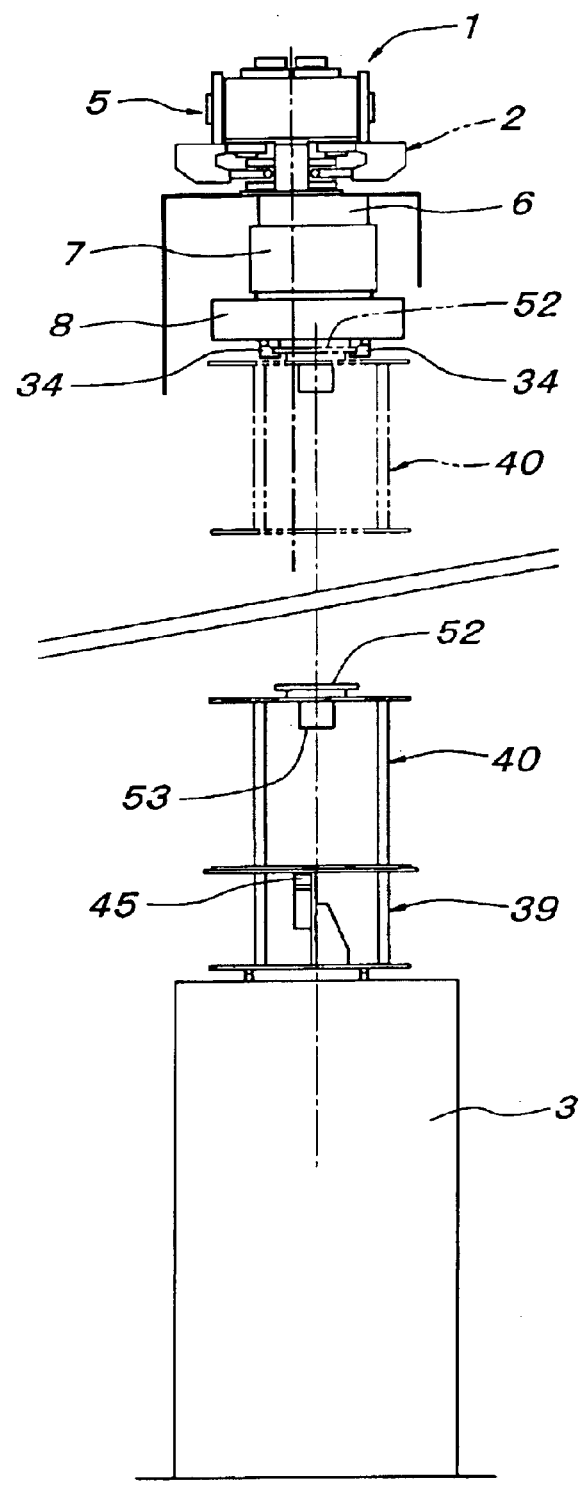
FIG. 8 is a front view of the hanging conveyor, showing the learning process for the detection of displacement.
Figure 9:
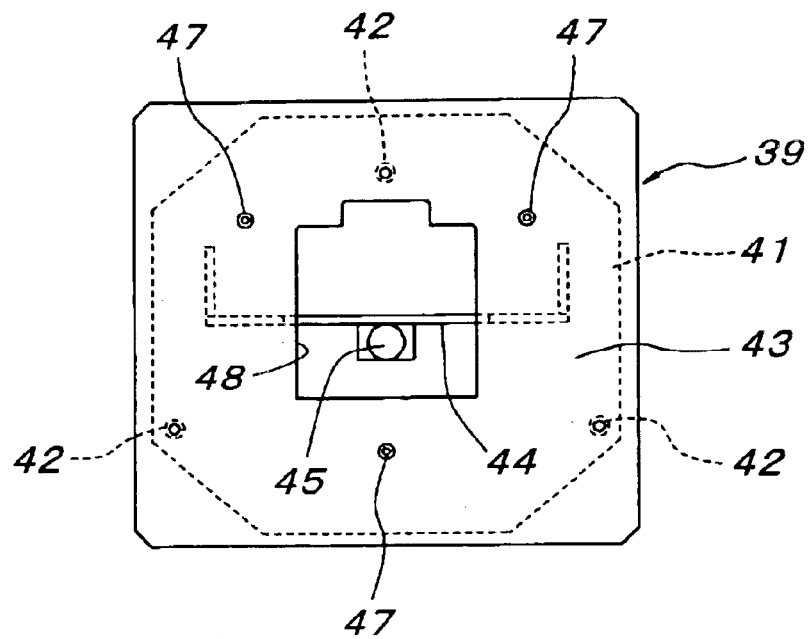
FIG. 9 is a top plan of the first jig of the conveyance equipment.
Figure 10:
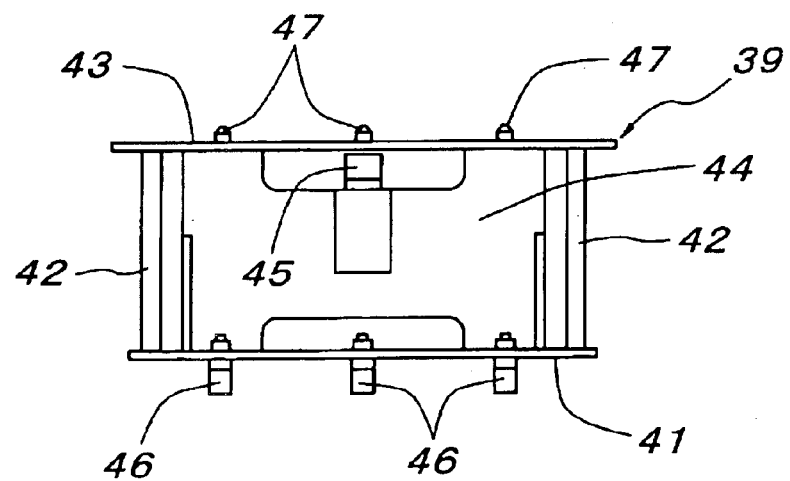
FIG. 10 is a side view of the first jig.
Figure 11:
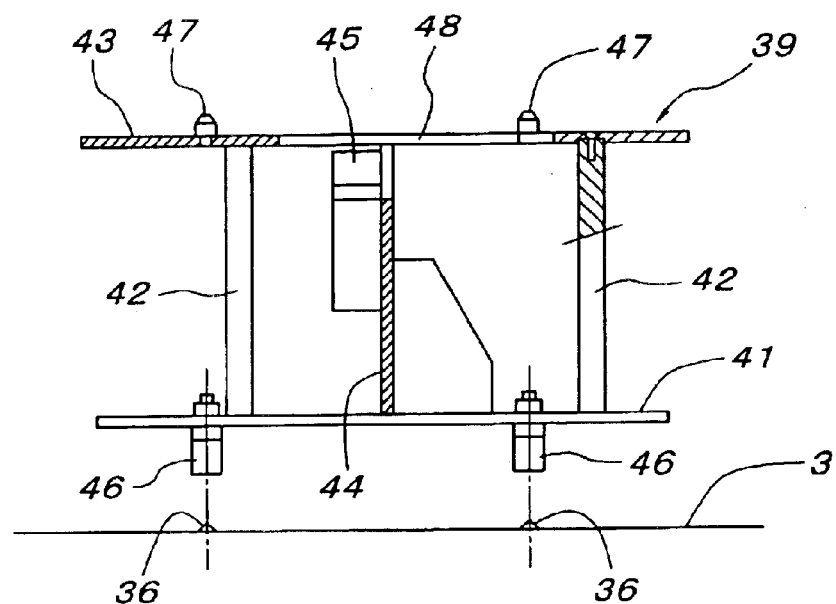
FIG. 11 is a front view partially in vertical section of the first jig.
Figure 12:
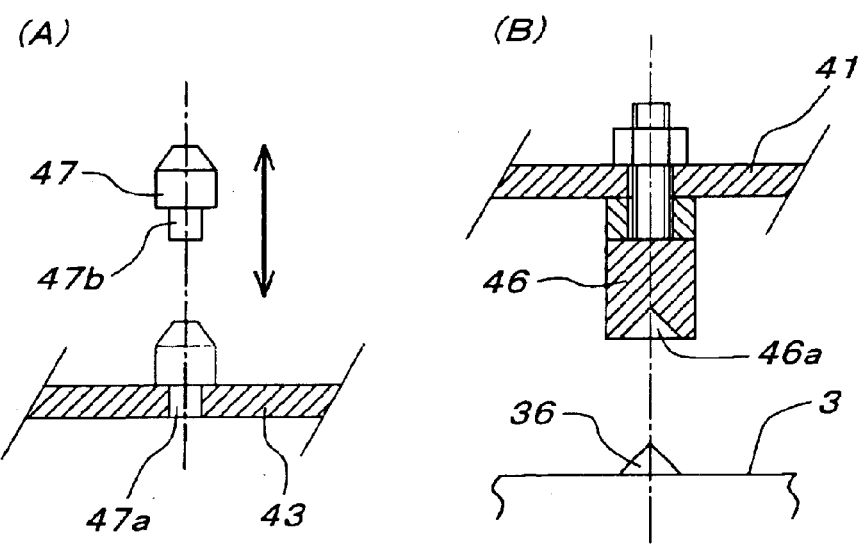
FIG. 12A is an enlarged front view partially in vertical section of parts of the first jig.
FIG. 12B is an enlarged front view partially in vertical section of other parts of the first jig.
Figure 13:
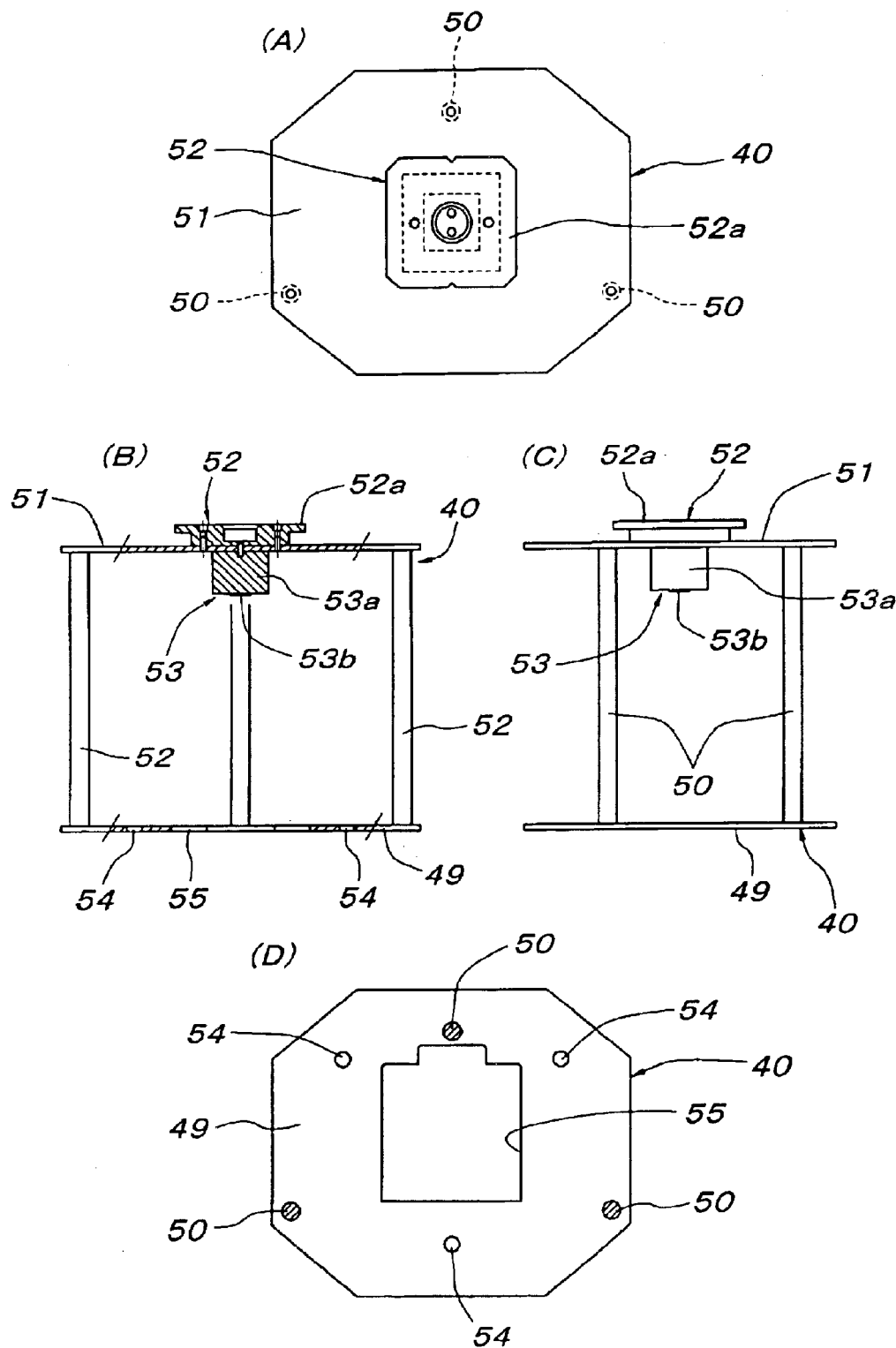
FIGS. 13A, 13B, 13C and 13D are a top plan, a side view partially in vertical section, a front view and a horizontal section respectively of the second jig of the conveyance equipment.

With reference to FIGS. 7 and 8, the learning system includes a first jig 39 and a second jig 40. The first jig 39 can be placed in the fixed position on each port 3. The second jig 40 can be placed in a fixed position on the first jig 39. As shown in FIGS. 9–12, the first jig 39 includes a lower plate 41, struts 42, an upper plate 43, a vertical plate 44 and an image pickup camera 45, which may be a CCD. The upper plate 43 rests on the struts 42, which stand on the lower plate 41. The vertical plate 44 extends between the plates 43 and 41. The camera 45 is fixed on one side of the vertical plate 44 and faces upward. The lower plate 41 has three (some) legs 46 fixed on its underside. Each leg 46 is associated with one of the positioning protrusions 36 (FIG. 6B) on each port 3. As shown in FIG. 12B, each leg 46 has a conical positioning recess 46a formed in its bottom, which can engage with the associated protrusion 36 on each port 3. The upper plate 43 has three (some) positioning pins 47 protruding detachably from its upper side. As shown in FIG. 12A, the upper plate 43 has holes 47a formed through it each in vertical alignment with one of the legs 46. As also shown, each pin 47 includes a shank or stem 47b for detachable engagement with one of the holes 47a. The upper plate 43 also has an opening 48 formed through it, through which the camera 45 can take a picture.

As shown in FIGS. 13A–13D, the second jig 40 includes a lower plate 49, struts 50, and an upper plate 51. The upper plate 51 rests on the struts 50, which stand on the lower plate 49. The upper plate 51 has a head 52 fixed to the center of its upper side. The head 52 has a flange 52a, which is identical with the flanges 35 of the works W. The upper plate 51 is fitted with a detection unit 53, which includes a block 53a and a mark sheet 53b. The block 53a is fixed to the center of the underside of the upper plate 51. The mark sheet 53b is stuck on the bottom of the block 53a and printed with marks. The lower plate 49 has three (some) positioning holes 54 and an opening 55 all formed through it. When the second jig 40 is placed in a fixed position on the first jig 39, each hole 54 engages with one of the positioning pins 47 on the first jig 39, and the opening 55 is aligned with the opening 48 of the first jig 39.

Figure 14:
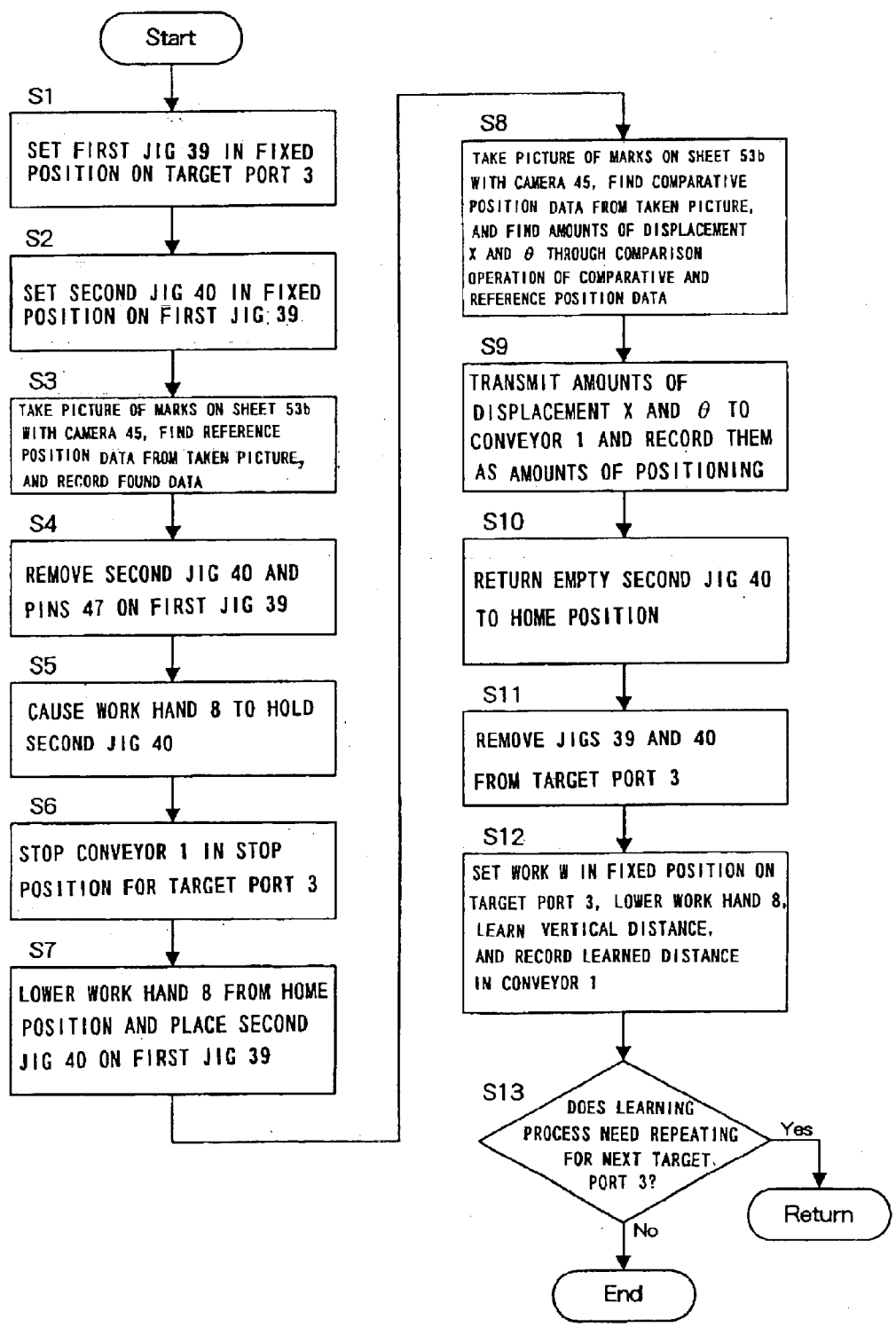
FIG. 14 is a flowchart of the learning process for the detection of displacement.

FIG. 14 is a flowchart of the learning process that can be performed for each port 3 by the two jigs 39 and 40 and an operation/recording/transmission processor 56 (FIG. 7), which is connected to the image pickup camera 45. As shown with solid lines in FIGS. 7 and 8, the first step S1 of this process is to set the first jig 39 in the fixed position on the port 3, where the positioning recesses 46a of the first jig 39 engage with the respective protrusions 36 of the port 3. As also shown, the next step S2 is to set the second jig 40 in the fixed position on the first jig 39, where the positioning holes 54 of the second jig 40 engage with the respective pins 47 of the first jig 39. The next step S3 includes taking a picture of the marks on the mark sheet 53b of the set second jig 40 with the camera 45 of the first jig 39. The step S3 also includes processing the mark picture to obtain reference position data for the port 3. The step S3 further includes recording the obtained data.

The next step S4 is to remove the second jig 40 from the first jig 39 and remove the positioning pins 47 from the first jig 39. The next step S5 is to set the removed second jig 40 on the work hand 8, with the head flange 52a held by the work holders 34. Prior to this step, the work hand 8 is lowered to a suitable position. Thereafter, the work hand 8 on which the second jig 40 is set is returned to its home position, where it is most lifted by the vertical drive unit 7 and neutral within a horizontal two-dimensional positioning range. Specifically, in the home position, the lateral positioning slider 6 is positioned nearly in the middle of its range of lateral movement in the directions TD, and the vertical drive unit 7 is positioned nearly in the middle of its range of turning around the vertical shaft 24.

The next step S6 is to make the carriage 5 travel, and to stop it at the stop position SPn for the port 3. The next step S7 is to lower the work hand 8 from the conveyor 1 in the position SPn and place the held second jig 40 on the first jig 39 set on the port 3. It is preferable that, just before the second jig 40 is placed on the first jig 39, the downward movement of the work hand 8 be interrupted until the hand 8 and the second jig 40 become stationary. Preferably, the stationary work hand 8 should be lowered again to place the stationary second jig 40 on the first jig 39. The lowered second jig 40 is supported, just in the position in which it is lowered, on the flat top of the first jig 39, from which the positioning pins 47 have been removed.

If the port 3 is not shifted horizontally relative to the stop position SPn, the position of the second jig 40 thus placed on the first jig 39 coincides with the fixed position of the second jig 40 set on the first jig 39 in the step S2. If the port 3 is shifted horizontally two-dimensionally relative to the stop position SPn, the second jig 40 placed on the first jig 39 is displaced horizontally relative to the first jig 39. The next step S8 includes taking a picture of the marks on the mark sheet 53b of the displaced second jig 40 with the image pickup camera 45 on the first jig 39. The step S8 also includes processing this mark picture to obtain comparative position data. The step S8 further includes finding, through the comparison operation of the obtained comparative position data and the reference position data recorded in the step S3, the amounts of displacement X and $\theta$ of the comparative position data from the reference position data in the lateral directions TD and the turning directions RD respectively.

Each stop position SPn is set by a stop position detection plate or the like, which is fitted near the guide rails 2. The fitting position of the detection plate can be freely adjusted for accurate setting of the stop position SPn. This ensures sufficiently accurate vertical alignment of each stop position SPn with the associated port 3 with respect to the travelling directions VD. It is accordingly assumed that the second jig 40 on the flat top of the first jig 39 may be displaced only in the lateral directions TD and/or the turning directions RD.

The next step S9 includes transmitting the amounts of displacement X and $\theta$ to the carriage 5 if they exceed tolerances. The carriage 5 has a controller with a memory for the registration of amounts of positioning. The step S9 also includes recording, in the controller memory, the transmitted amounts of displacement X and $\theta$ as the amounts of positioning for the work hand 8 with respect to the port 3. The absolute values of the recorded amounts of positioning are equal to those of the amounts of displacement X and $\theta$ of the second jig 40 relative to the port 3. For example, if one of the amounts of displacement X and $\theta$ is positive, the associated amount of positioning is negative.

The next step S10 includes releasing the second jig 40 on the first jig 39 from the work hand 8 by moving the work holders 34 away from each other. The step S10 also includes lifting the empty work hand 8 to its home position. The next step S11 is to remove the released second jig 40 and the first jig 39 from the port 3. The step S11 is the final step of the learning process for finding the amounts of displacement X and $\theta$. In practice, however, the step S11 may be followed by the step S12. The step S12 includes setting a work W in the fixed position on the empty port 3, where the positioning protrusions 36 and recesses 37 engage. The step S12 also includes lowering the work hand 8 manually to the unloading position for the work W, where the work holders 34 are positioned under the flange 35 of the work. The step S12 further includes finding the vertical distance for which the work hand 8 has been lowered from the home position to the unloading position. The step S12 further includes recording, in the controller of the hanging conveyor 1, the found distance as the vertical distance for which the work hand 8 should vertically move with respect to the port 3.

The learning process is repeated for all of the ports 3 (S13). In practice, the learning process for each port 3 may be followed by a process for loading and unloading the port 3 actually in a test run mode, with the work hand 8 positioned on the basis of the associated amounts of positioning recorded in the learning process. This loading and unloading process includes the steps of loading a work W onto the port 3 and unloading the work W on the port to prove whether there is any problem. If there is a problem, the recorded amounts of positioning need to be deleted and the learning process needs to be performed again. If the work W can be normally unloaded but cannot be normally loaded, the amounts of displacement X and θ differ between the time when the work hand 8 is empty and the time when the hand 8 holds the work W.

Figure 15:
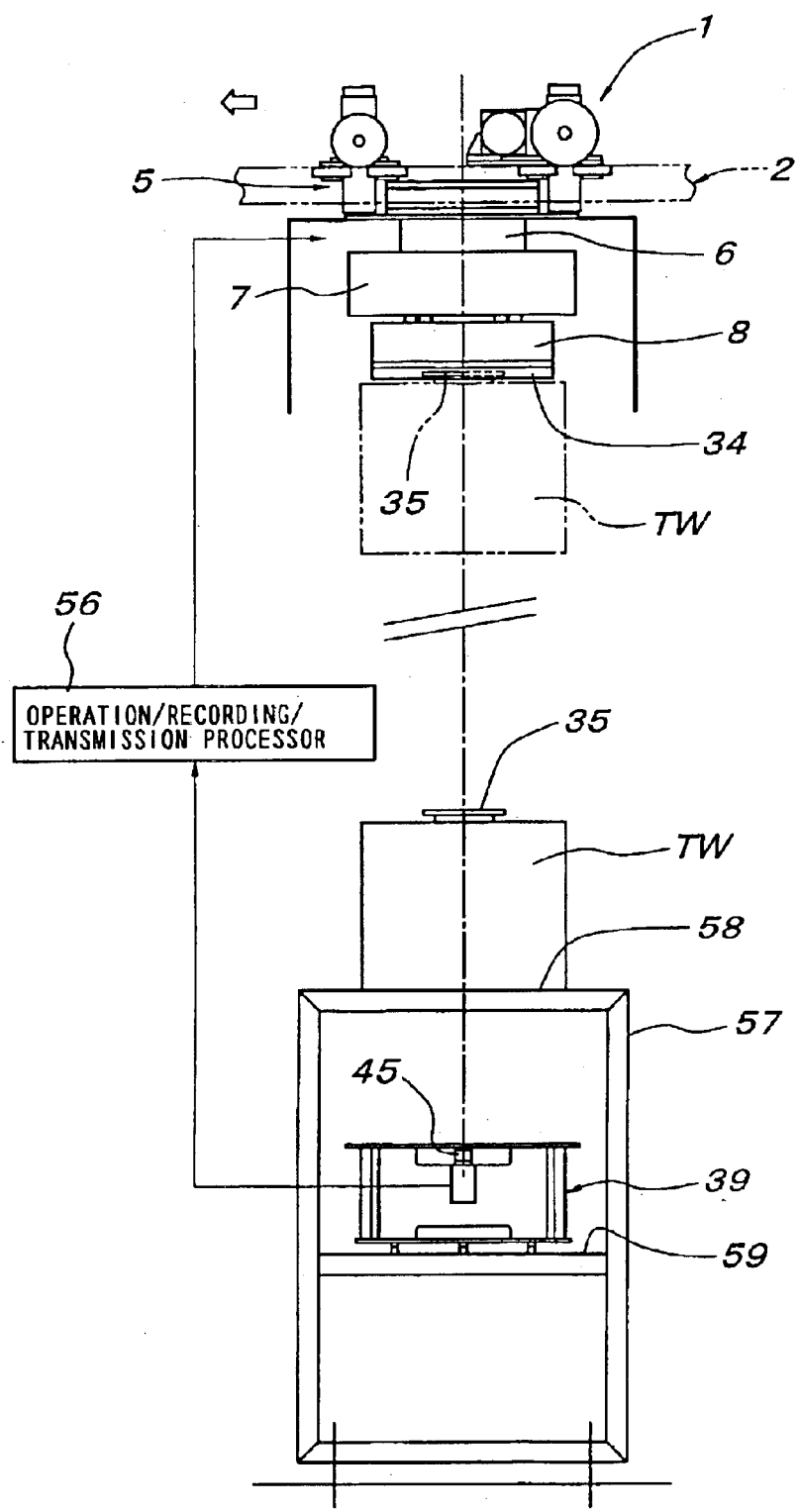
FIG. 15 is a side view of the hanging conveyor, showing the learning process for the detection of amounts of work-lowering correction.
Figure 16:
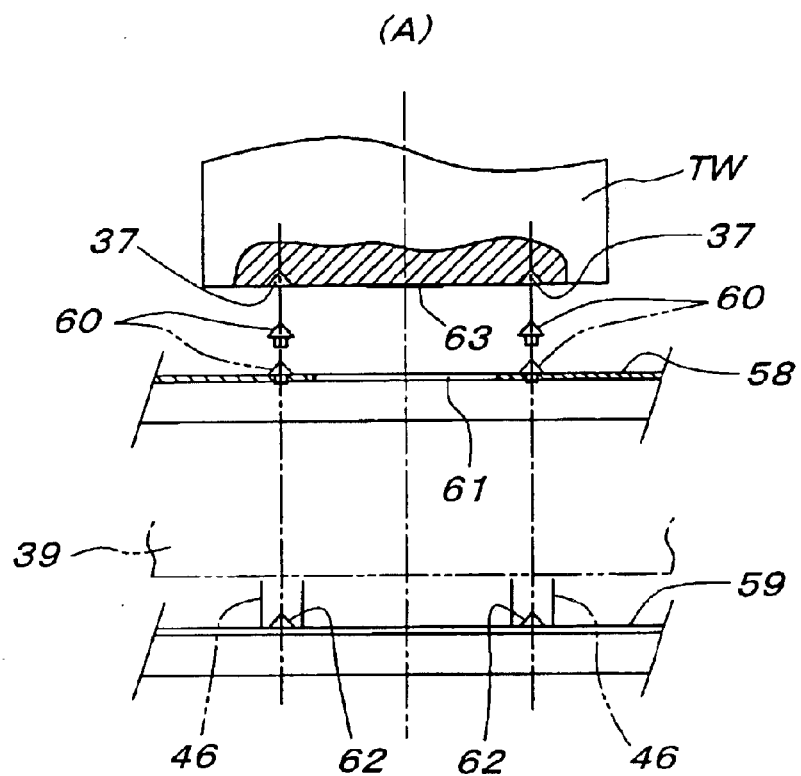
FIG. 16A is a side view in vertical section of part of the tentative port of the conveyance equipment.
FIGS. 16B and 16C are top plans of shifted learning works.
Figure 16:
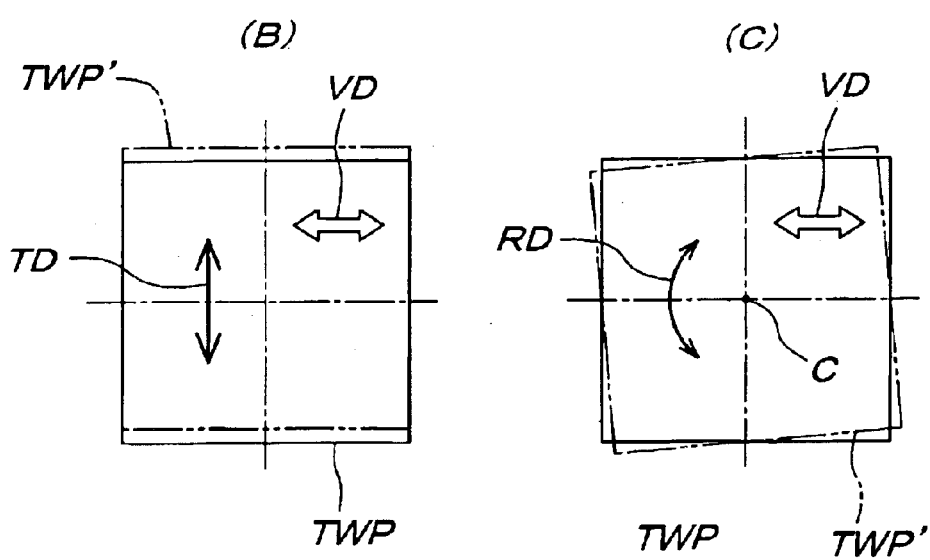

The present invention also involves the learning process, which is other than the foregoing learning process, for finding amounts of correction that can be applied when a work W is lowered. For this learning process, as shown in FIG. 15, a tentative port 57 is installed on the floor just under the travelling path for the carriage 5. The tentative port 57 includes a supporting plate 58 and a middle shelf 59. The supporting plate 58 is positioned nearly at the height of the work supporting surfaces of the ports 3. The middle shelf 59 can support the first jig 39. As shown in FIG. 16A, the supporting plate 58 is fitted with three (some) detachable positioning pins 60, each of which has a conical head and a shank or stem. This pin head is identical with the protrusions 36 on the ports 3. This pin shank may be identical with the shanks 47b of the pins 47 on the first jig 39. As also shown, the supporting plate 58 has a central opening 61, through which pictures can be taken. The middle shelf 59 has three (some) positioning protrusions 62, each of which is aligned vertically with one of the protrusions 60 on the supporting plate 58, and which are identical with the protrusions 36.

Figure 17:
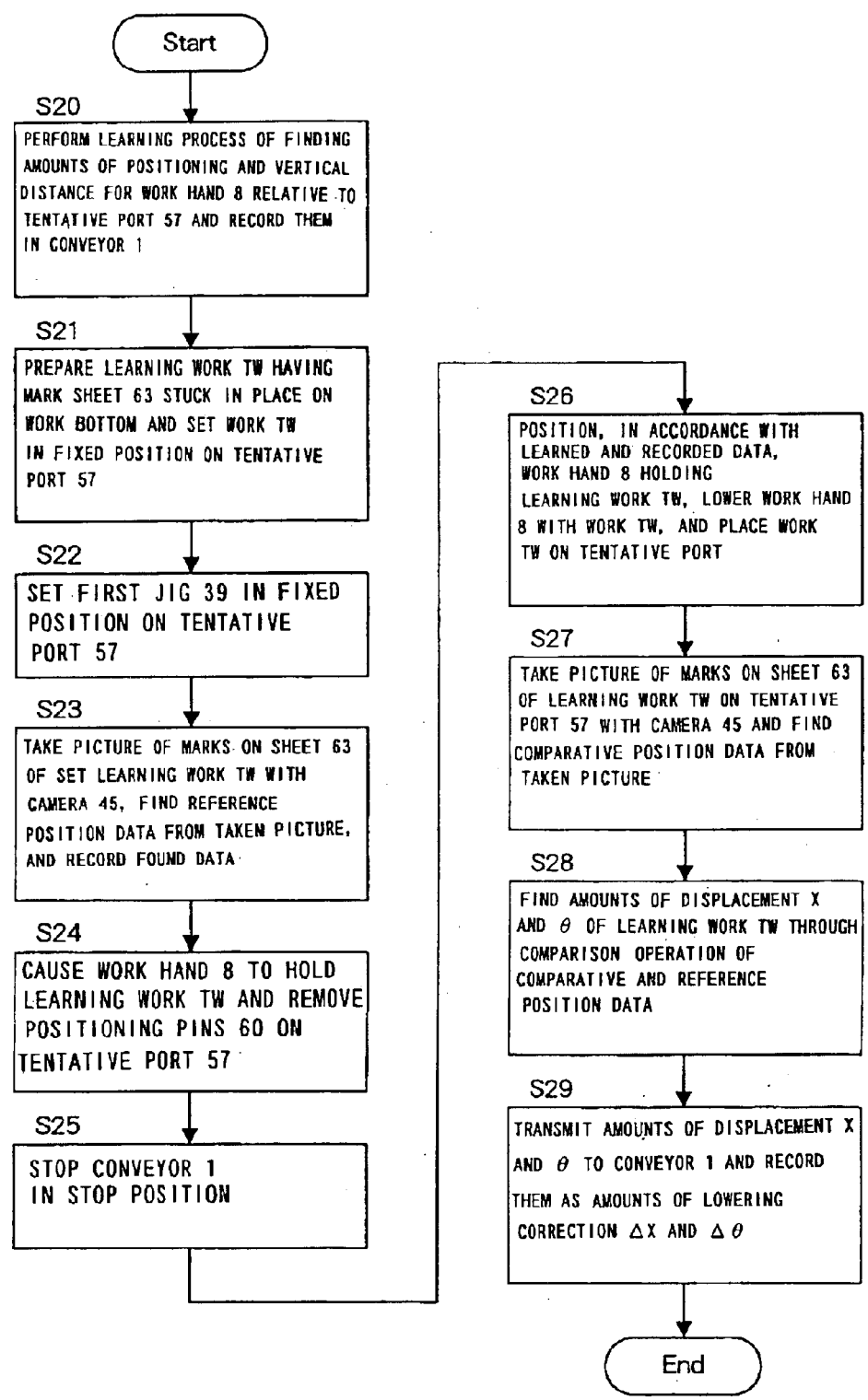
FIG. 17 is a flowchart of the learning process for the detection of amounts of work-lowering correction.

FIG. 17 is a flowchart of the learning process for finding amounts of correction. A stop position similar to the stop positions SPn for the ports 3 is set above the tentative port 57. The first step S20 of this learning process includes detecting shifts of the tentative port 57 by performing the foregoing learning process (FIG. 14) for this port 57, with the supporting plate 58 serving similarly to the top of each port 3. The step S20 also includes finding the amounts of positioning and the vertical distance for the work hand 8 with respect to the tentative port 57. The step S20 further includes recording the found amounts and distance in the carriage 5.

As shown in FIG. 16A, the next step S21 includes preparing a learning work TW by sticking a mark sheet 63 on a predetermined central portion of the underside of a work W. The mark sheet 63 is identical with the sheet 53b of the second jig 40. As shown in FIG. 15, the step S21 also includes setting the learning work TW in a fixed position on the supporting plate 58 of the tentative port 57. This fixed position is where the positioning recesses 37 in the bottom of the learning work TW engage with the pins 60 on the supporting plate 58. The next step S22 is to set the first jig 39 in a fixed position on the middle shelf 59 of the tentative port 57. This fixed position is where the positioning recesses 46a of the first jig 39 engage with the pins 62 on the shelf 59.

The next step S23 includes taking a picture of the marks on the mark sheet 63 of the set learning work TW with the camera 45 of the first jig 39. The step S23 also includes processing the mark picture to obtain reference position data for this work TW. The step S23 further includes recording the position data. The next step S24 includes removing the learning work TW from the tentative port 57. The step S24 also includes making the work hand 8 hold the removed work TW. The step S24 further includes removing the positioning pins 60 from the supporting plate 58 of the unloaded tentative port 57.

The next step S25 is to stop the carriage 5 in the stop position for the tentative port 57. The next step S26 includes positioning, on the basis of the learned data recorded for the tentative port 57, the work hand 8 holding the learning work TW in the home position. The step S25 also includes lowering the work hand 8 from the home position to place the learning work TW on the supporting plate 58 of the tentative port 57. It is likewise preferable that, just before the learning work TW is placed on the tentative port 57, the downward movement of the work hand 8 be interrupted until the hand 8 and the work TW become stationary. Preferably, the stationary work hand 8 should be lowered again to place the stationary learning work TW on the tentative port 57. The lowered learning work TW is supported, just in the position in which it is lowered, on the flat upper side of the supporting plate 58 of the tentative port 57, from which the positioning pins 60 have been removed.

The next step S27 includes taking a picture of the marks on the mark sheet 63 of the learning work TW on the supporting plate 58 with the image pickup camera 45 on the first jig 39. The step S27 also includes processing this mark picture to obtain comparative position data for the learning work TW. The next step S28 includes finding, through the comparison operation of the obtained comparative position data and the reference position data recorded for the learning work TW, the amounts of displacement X and θ of this work TW in the lateral directions TD and the turning directions RD respectively. The next step S29 includes transmitting the found amounts of displacement to the carriage 5 if they exceed tolerances. The step S29 also includes recording the transmitted amounts of displacement X and θ as the amounts of work-lowering correction ΔX and Δθ respectively for this work.

The displacement of the learning work TW is explained below in detail. The work hand 8 lowering toward the tentative port 57 has been positioned on the basis of the amounts of positioning for the tentative port 57. If the positioned empty hand 8 were lowered toward the learning work TW supported in the fixed position on the tentative port 57, it would not be displaced in the lateral directions TD and the turning directions RD. Accordingly, the recorded amounts of work-lowering correction Δ X and Δθ are based on the amounts of displacement X and θ at the time when the work hand 8 lowers together with the learning work TW. The learning work TW held by the work hand 8 may shift in the lateral direction TD while it is lowering. In this case, as shown in FIG. 16B, the position TWP' of the lowering work TW is displaced from the fixed position TWP of the learning work TW on the tentative port 57. The learning work TW held by the work hand 8 may shift in the turning directions RD while it is lowering. In this case, as shown in FIG. 16C, the position TWP' of the lowering work TW is displaced from the fixed position TWP of the learning work TW on the tentative port 57. In other words, the amounts of displacement X and θ of the learning work TW are the amounts of displacement of the position TWP' of this work TW lowered actually to the fixed position TWP. Of course, the learning work TW may shift in the lateral and turning directions TD and RD at the same time. While the learning work TW is lowering, it may shift in the travelling directions VD as well, but the amounts of displacement in these directions are omitted.

Figure 18:
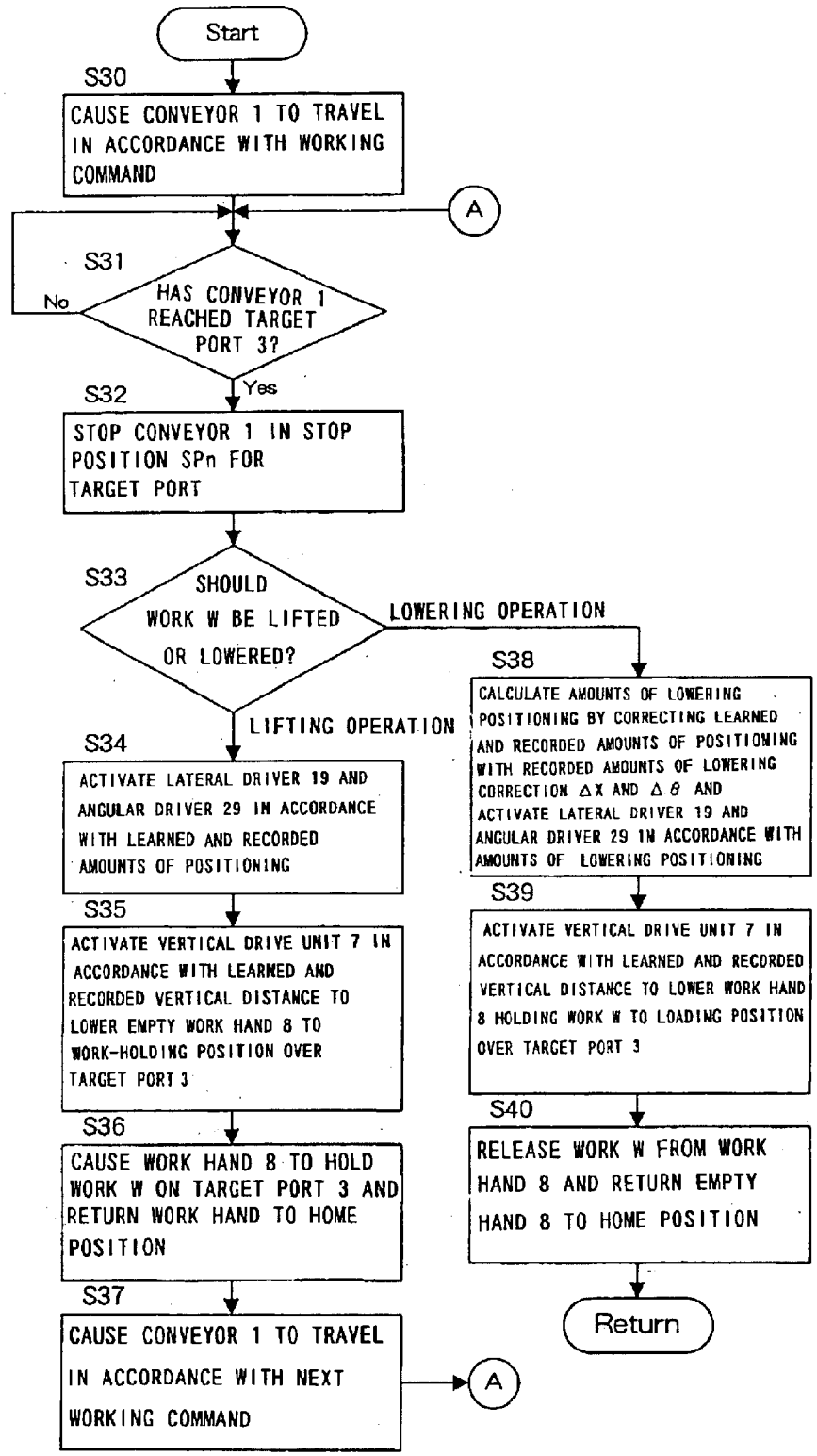
FIG. 18 is a flowchart of the control procedure during actual working, which uses the amounts of positioning set for the work hand.

FIG. 18 is a flowchart of the control process performed while each port 3 is loaded and unloaded, with the carriage 5 actually operating. The first step S30 of this process is to make the carriage 5 travel toward the port 3 in accordance with a working command. The next step S31 is to determine whether the carriage 5 has reached the port 3. If the carriage 5 has reached the port 3, the process moves to the step S32 of stopping the carriage 5 in the stop position SPn for the port 3.

The next step S33 is to determine whether the working command is to lift or lower a work W. If the working command is to lift a work W, the process moves to the step S34. The step S34 includes searching for the learned amounts of positioning for the port 3 out of those recorded for all of the ports 3. The step S34 also includes activating the lateral and angular drivers 19 and 29 in accordance with the learned amounts of positioning for the port 3 to position the work hand 8 in the lateral directions TD and the turning directions RD in its home position. The next step S35 includes searching for the vertical distance for the port 3 out of the vertical distances recorded for all of the ports 3. The step S35 also includes activating the vertical drive unit 7 in accordance with this vertical distance to lower the empty work hand 8 to the holding position where the hand 8 can hold the work W standing by in the fixed position on the port 3. The next step S36 includes making the work hand 8 hold the work W. The step S36 also includes lifting the work hand 8 together with the held work W by means of the vertical drive unit 7. The step S36 further includes returning the work hand 8 to its home position by means of the lateral and angular drivers 19 and 29. The next step S37 is to make the carriage 5 travel toward the port 3 onto which the lifted work W should be lowered in accordance with the next working command.

If the working command in the step S33 is to lower a work W, the process moves to the step S38. This step S38 includes searching for the learned amounts of positioning for the port 3 out of those recorded for all of the ports 3. The step S38 also includes calculating the amounts of work-lowering positioning for the work W by correcting the learned amounts of positioning for the port 3 with the amounts of work-lowering correction $\Delta X$ and $\Delta \theta$ recorded for the work W. The step S38 further includes activating the lateral and angular drivers 19 and 29 in accordance with the amounts of work-lowering positioning to position the work hand 8 in the lateral directions TD and the turning directions RD in its home position. The next step S39 includes searching for the vertical distance for the port 3 out of the vertical distances recorded for all of the ports 3. The step S39 also includes activating the vertical drive unit 7 in accordance with this vertical distance to lower the work hand 8 together with the work W to the loading position over the port 3, where the hand 8 can release the work W. The next step S40 includes releasing the work W from the work hand 8. The step S40 also includes lifting the empty hand 8 by means of the vertical drive unit 7. The step S40 further includes returning the work hand 8 to its home position by means of the lateral and angular drivers 19 and 29.

There may be a case where the amounts of work-lowering correction $\Delta X$ and $\Delta \theta$ found in the learning process shown in FIG. 17 are zero or within tolerances. In this case, whether a work W is lifted or lowered, the work hand 8 is positioned with respect to each port 3 only on the basis of the amounts of positioning found for the port 3 in the learning process shown in FIG. 14. In other words, if the work W is lifted and lowered normally during a test run, which may be performed in the test run mode after the learning process shown in FIG. 14, there is no need for the learning process of finding amounts of correction.

In the learning process for finding amounts of correction, the first jig 39 fitted with the camera 45 is used as a means for detecting the position of a learning work TW placed on the tentative port 57. Alternatively, the tentative port 57 might be fitted with an exclusive detecting means. In this case, the first jig 39 might be fitted with a detected part, such as a mark sheet 53b, and the second jig 40 might be fitted with a detector, such as an image pickup camera 45, for detecting the horizontal two-dimensional position of the detected part. The detected part might alternatively be marks formed directly on the first or second jig 39 or 40. The marks on the mark sheet 53b, or on the jig 39 or 40 may be letters, characters, symbols or any other design from which horizontal two-dimensional positions and turning displacement can be accurately read. Of course, another detecting means than the image pickup camera as an image sensor might be used with a suitable detected part. For example, the detected part may comprise light emitting elements, and the detecting means may be a photoelectric sensor for detecting them. Another detected part may be used with a conventional known means for accurately detecting the horizontal two-dimensional position of this part.

As stated already, the amounts of horizontal two-dimensional positioning and the amounts of work-lowering correction for the work hand 8 are found by the learning processes including the steps of detecting the amounts of displacement X and $\theta$ in the lateral direction TD and the turning directions RD respectively of the hand 8 and the learning work TW. The learning processes may further includes the steps of calculating the amount of displacement Y in the travelling directions VD for each port 3 from the reference position data and the comparative position data, displaying or printing out the amount displacement Y if it exceeds a tolerance, and adjusting the associated stop position SPn in accordance with the amount of displacement Y. Alternatively, the learning processes may include the step of positioning the work hand 8 in the travelling directions VD by stopping the carriage 5 once in the stop position SPn, and by then moving it finely for the distance equivalent to the amount of displacement Y in the appropriate direction.

The carriage body 11 might be fitted with a back-and-forth positioning slider that can be slid in the travelling directions VD. This positioning slider might support the lateral positioning slide 6 to position the work hand 8 in the directions VD by moving it for the distance equivalent to the amount of displacement Y in the appropriate direction.

As stated already, the carriage 5 has a controller with a memory for the registration of amounts of positioning. The amounts of displacement X and $\theta$ and amounts of work-lowering correction $\Delta X$ and $\Delta \theta$, which are calculated by the learning processes, can be transmitted by wireless or another means from the operation/recording/transmission processor 56, which is used in these processes, to the carriage 5. As also stated, the transmitted amounts of displacement are recorded as amounts of positioning for the work hand 8 in the memory. The transmitting means is not limited to wireless. For example, the amounts of displacement (amounts of positioning) associated with the ports 3 may be recorded on a suitable medium, which could be set in or on the carriage 5, and from which the amounts of displacement could be read out. Alternatively, the central control unit, not the carriage 5, could have the database of the amounts of displacement (amounts of positioning) associated with the ports 3. In this case, the information on the amounts of displacement (amounts of positioning) associated with each port 3 could be transmitted together with a working command by wireless or another means to the carriage 5.

In the present invention, amounts of work-lifting positioning and amounts of work-lowering positioning are set for each port. In the foregoing embodiment, amounts of positioning (amounts of displacement X and θ) and amounts of work-lowering correction ΔX and Δθ are set for each port 3 and recorded. When the work W on the port 3 is lifted, the recorded amounts of positioning are used as they are. When a work W is lowered onto the port 3, the recorded amounts of positioning are corrected with the recorded amounts of work-lowering correction so that amounts of work-lowering positioning can be found. Alternatively, the amounts of positioning (amounts of displacement X and θ) for each port 3 might be corrected with the associated amounts of work-lowering correction ΔX and Δθ so that amounts of work-lowering positioning could be calculated in advance for the port 3. A database consisting of the amounts of work-lifting positioning and the amounts of work-lowering positioning for each port might be made. The position of the work hand 8 might be controlled on the basis of this database without the correction performed with the amounts of work-lowering correction ΔX and Δθ during actual operation.

The learning processes have been described as used for the single hanging conveyor 1 (carriage 5). In practice, however, hanging conveyance equipment of the type described herein includes a number of hanging conveyors 1. Enormous labor and time are required for performing the learning processes for all of the ports 3 and 57 with all of the hanging conveyors 1. This problem can be solved by a learning method according to the present invention.

Figure 19:
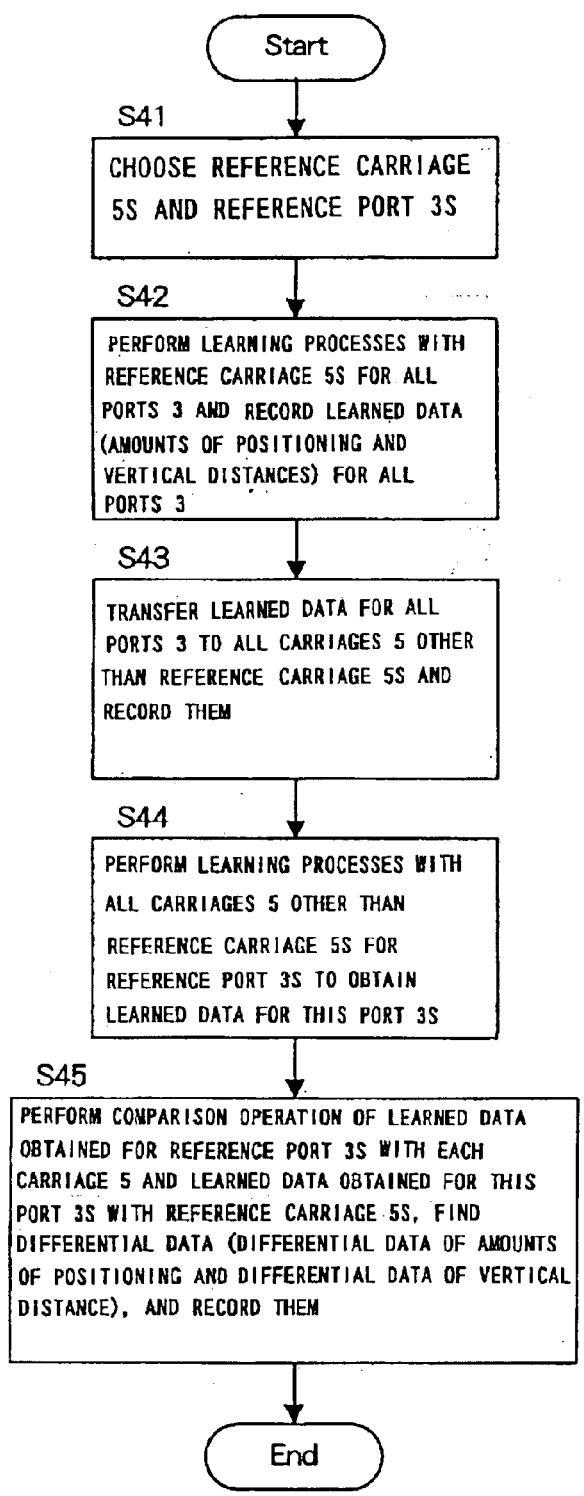
FIG. 19 is a flowchart of the practical learning method used for all of the hanging conveyors of the conveyance equipment.

FIG. 19 is a flowchart of the practical learning method used for all of the hanging conveyors 1. The first step S41 of this method is to choose a reference carriage 5S from the carriages 5 and choose a reference port 3S from the ports 3. The next step S42 includes performing the learning processes with the reference carriage 5S for all ports 3 to obtain learned data, which include amounts of positioning and a vertical distance, for each port 3. The step S42 also includes recording the learned data for the ports 3 at the learned data registration addresses in the reference carriage 5S. The step S43, which may be parallel with the step S42, includes transferring the learned data for the ports 3 to the learned data registration addresses in the other carriages 5 by a suitable means. The step S43 also includes recording the transferred data at these addresses. This unifies the learned data for the ports 3 that the carriages 5, inclusive of the reference carriage 5S, have.

The next step S44 is to perform the learning processes with each of the carriages 5 other than the reference carriage 5S for the reference port 3S to obtain learned data, which include amounts of positioning and a vertical distance, for this port 3S. The next step S45 includes performing a comparison operation of the thus obtained data and the learned data for the reference port 3S searched for from the learned data recorded for the ports 3 at the step S43. The comparison operation gives differential data equivalent to the individual difference between the carriage 5 and the reference carriage 5S. The differential data consist of the differential data of the amounts of positioning and the differential data of the vertical distance. The step S45 also includes recording the differential data at the correction value registration addresses in the carriage 5.

After the learning processes, a test run is performed with a work W on the basis of the associated learned data. If the work W is not lowered adequately during the test run, the learning process shown in FIG. 17 is performed by the reference carriage 5S to find amounts of work-lowering correction. Then, the found amounts of correction are transferred to and recorded at the correction value registration addresses or the exclusive registration addresses for amounts of work-lowering correction that the carriages 5 and 5S have.

When each of the carriages 5 actually operates to load and unload each of the ports 3 by the control process shown in FIG. 18. The learned and recorded amounts of positioning in FIG. 18 are determined on the basis of the unified data recorded at the learned data registration addresses and the differential data recorded at the correction value registration addresses. Specifically, if the differential data is recorded, the unified data for the port 3 is corrected automatically with the differential data so that learned and recorded amounts of positioning are found for practical application. The port 3 is loaded and unloaded on the basis of the found amounts of positioning.

What is claimed is:

1. Hanging conveyance equipment comprising:
   a carriage movable along a horizontal travelling path having a plurality of stop positions arranged thereralong;
   work supports each fixed below one of the stop positions; and
   a work hand for holding a work hanging therefrom, the work hand supported by the carriage and being vertically movable with respect to the carriage to load a work onto or unload a work from each of the work supports;
   an amount of work-lifting positioning and an amount of work-lowering positioning being both set for the work hand with reference to each of the work supports;
   wherein the carriage is provided with a lateral positioning slider shiftable laterally at a right angle of the traveling path, and the work hand is mounted hangingly on the lateral positioning slider so rotatably relative to the lateral positioning slider as to be positioned angularly around a vertical axis;
   wherein the work hand is positioned laterally at a right angle of the traveling path of the carriage by the lateral shifting of the lateral positioning slider, and also is positioned angularly around a vertical axis by the rotation relative to the lateral positioning slider in accordance with the amount of work-lifting positioning set with reference to each of the work supports when the work hand is lowered from the carriage in the associated stop position to lift a work support; and
   wherein the work hand is positioned laterally at a right angle of the traveling path of the carriage by the lateral shifting of the lateral positioning slider, and also is positioned angularly around a vertical axis by the rotation relative to the lateral positioning slider in accordance with the amount of work-lowering positioning set with reference to each of the work supports when the work hand is lowered from the carriage in the associated stop position to lower a work onto the work support.

2. Hanging conveyance equipment according to claim 1 wherein the work hand is positioned with respect to the carriage laterally at right angles to the horizontal travelling path and angularly around a vertical axis.

3. Hanging conveyance equipment comprising:
   a carriage movable along a horizontal travelling path having a plurality of stop positions arranged thereralong;

work supports each fixed below one of the stop positions, the work supports each having an amount of work-lifting positioning and an amount of work-lowering positioning both set therefor; and a work hand for holding a work hanging therefrom, the work hand supported by the carriage in such a manner that the hand can be positioned horizontally two-dimensionally with respect to the carriage, the work hand being vertically movable with respect to the carriage to load a work onto or unload a work from each of the work supports;

wherein the work hand is positioned horizontally two-dimensionally in accordance with the amount of work-lifting positions for each of the work supports when the work hand is lowered from the carriage in the associated stop position to lift a work from the support; and wherein the work hand is positioned horizontally two-dimensionally in accordance with the amount of work-lowering positioning for each of the work supports when the work hand is lowered from the carriage in the associated stop position to lower a work onto the support;

wherein the amount of work-lowering positioning for each of the work supports is the associated amount of work-lifting positioning corrected with an amount of correction equivalent to the error between the position of the work hand holding a work and lowered to a predetermined height over the work support and the position of the hand lowered to the height without holding a work.

4. Hanging conveyance equipment according to claim 3 wherein the work hand is positioned with respect to the carriage laterally at right angles to the horizontal travelling path and angularly around a vertical axis.

5. Hanging conveyance equipment according to claim 3 wherein the amount of work-lowering positioning for each of the work supports is the associated amount of work-lifting positioning corrected with an amount of correction equivalent to the error between the position of the work hand holding a work and lowered to a predetermined height over the work support and the position of the hand lowered to the height without holding a work.

6. A learning system for use with hanging conveyance equipment including a carriage movable along a horizontal travelling path having a plurality of stop positions arranged therealong, work supports each fixed below one of the stop positions, the work supports each having a fixed position set thereon, and a work hand for holding a work hanging therefrom, the work hand supported by the carriage in such a manner that the hand can be positioned horizontally two-dimensionally with respect to the carriage, the work hand being vertically movable with respect to the carriage to load a work onto or unload a work from each of the work supports, the learning system being able to learn an amount of horizontal two-dimensional displacement of the work hand with respect to each of the work supports at the time when the carriage is in the associated stop position, the learning system comprising:

a first jig that can be placed in the fixed positions on the work supports and has a fixed position thereon;

a second jig that can be placed in the fixed position on the first jig and includes a held part for engaging with the work hand to be held thereby;

one of the jigs including a detected part;

the other jig including a detector for detecting the horizontal two-dimensional position of the detected part to find reference position data for the detected part with the second jig placed an the fixed position on the first jig and comparative position data for the detected part with the second jig held by the work hand of the carriage in each the stop positions and lowered onto the first jig; and a means of displacement operation for finding an amount of horizontal two-dimensional displacement of the work hand with respect to each of the work supports from the reference position data and the associated comparative position data.

7. A learning system according to claim 6 wherein the amount of horizontal two-dimensional displacement found by the means of displacement operation consists of an amount of lateral displacement of the work band at right angles to the horizontal travelling path and an amount of angular displacement of the band around a vertical axis.

8. A learning system according to claim 7 wherein the detector is an image pickup camera fitted to the first jig and facing upward, and wherein the detected part is a mark placed on the second jig near the held part and facing downward.

9. A learning system according to claim 8 wherein the first jig includes a plurality of removable positioning pins fitted on the top thereof, and wherein the second jig has positioning holes formed in the bottom thereof each for engaging with one of the pins.

10. A learning system according to claim 9 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof, the tentative port including a second detector fitted under the fixed position thereof for detecting the detected part of the learning work; and a second means of displacement operation for finding, from reference position data obtained by the second detector detecting the detected part of the learning work placed in the fixed position on the tentative port and comparative position data obtained by the second detector detecting the detected part of the learning work held by the work hand of the carriage in the tentative stop position, an mount of horizontal two-dimensional displacement of the work hand lowered with the learning work.

11. A learning system according to claim 8 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof; the tentative port including a second detector fitted under the fixed position thereof for detecting the detected part of the learning work; and a second means of displacement operation for finding, from reference position data obtained by the second detector detecting the detected part of the learning work placed in the fixed position on the tentative port and comparative position data obtained by the second detector detecting the detected part of the learning work held by the work hand of the carriage in the tentative stop position, an amount of horizontal two-dimensional displacement of the work hand lowered with the learning work.

12. A learning system according to claim 7 wherein the first jig includes a plurality of removable positioning pins fitted on the top thereof, and wherein the second jig has positioning holes formed in the bottom thereof each for engaging with one of the pins.

13. A learning system according to claim 12 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof the tentative port including a second detector fitted under the fixed position thereof for detecting the detected part of the learning work; and a second means of displacement operation for finding, from reference position data obtained by the second detector detecting the detected part of the learning work placed in the fixed position on the tentative port and comparative position data obtained by tho second detector detecting the detected part of the learning work held by the work hand of the carriage in the tentative stop position, an amount of horizontal two-dimensional displacement of the work hand lowered with the learning work.

14. A learning system according to claim 7 wherein the horizontal travelling path further has a tentative stop position set therein, the learning system farther comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof, the tentative port including a second detector fitted under the fixed position thereof for detecting the detected part of the learning work; and a second means of displacement operation for finding from reference position data obtained by the second detector detecting the detected part of the learning work placed in the fixed position on the tentative port and comparative position data obtained by the second detector detecting the detected part of the learning work held by the work hand of the carriage in the tentative stop position, an amount of horizontal two-dimensional displacement of the work hand lowered with the learning work.

15. A learning system according to claim 6 wherein the detector is an image pickup camera fitted to the first jig and facing upward, and wherein the detected part is a mark placed on the second jig near the held part and facing downward.

16. A learning system according to claim 15 wherein the first jig includes a plurality of removable positioning pins fitted on the top thereof, and wherein the second jig has positioning holes formed in the bottom thereof each for engaging with one of the pins.

17. A learning system according to claim 16 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof, the tentative port including a second detector fitted under the fixed position thereof for detecting the detected part of the learning work and a second means of displacement operation for finding, from reference position data obtained by the second detector detecting the detected part of the learning work placed in the fixed position on the tentative port and comparative position data obtained by the second detector detecting the detected part of the learning work held by the work band of the carriage in the tentative stop position, an amount of horizontal two-dimensional displacement of the work hand lowered with the learning work.

18. A learning system according to claim 15 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof, the tentative port including a second detector fitted under the fixed position thereof for detecting the detected part of the learning work; and a second means of displacement operation for finding, from reference position data obtained by the second detector detecting the detected part of the learning work placed in the fixed position on the tentative port and comparative position data obtained by the second detector detecting the detected part of the learning work held by the work hand of the carriage in the tentative stop position, an mount of horizontal two-dimensional displacement of the work hand lowered with the learning work.

19. A learning system according to claim 6 wherein the first jig includes a plurality of removable positioning pins fitted on the top thereof, and wherein the second jig has positioning holes formed in the bottom thereof each for engaging with one of the pins.

20. A learning system according to claim 19 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where a learning work can be placed and that is set thereon at the same height as the fixed positions of the work supports are set, the learning work including a detected part fixed on the bottom thereof, the tentative port including a second detector fitted under the fixed position thereof for detecting the detected part of the learning work; and a second means of displacement operation for finding, from reference position data obtained by the second detector detecting the detected part of the learning work placed in the fixed position on the tentative port and comparative position data obtained by the second detector detecting the detected part of the learning work held by the work hand of the carriage in the tentative stop position, an amount of horizontal two dimensional displacement of the work hand lowered with the learning work.

21. A learning system according to claim 6 wherein the horizontal travelling path further has a tentative stop position set therein, the learning system further comprising:

a tentative port for exclusive use with a learning process for finding an amount of work-lowering correction, the tentative port fixed below the tentative stop position, the tentative port having a fixed position where learning work can be placed and that is set thereon at the same height as the fixed positions of the work supports are set, the learning work including a detected part fixed on the bottom thereof, the tentative port including a second detector fitted under the fixed position thereof for detecting the detected part of the learning work; and a second means of displacement operation for finding, from reference position data obtained by the second detector detecting the detected part of the learning work placed in the fixed position on the tentative port and comparative position data obtained by the second detector detecting the detected part of the learning work held by the work hand of the carriage in the tentative stop position, an amount of horizontal two-dimensional displacement of the work hand lowered with the learning work.

22. A learning method for use with hanging conveyance equipment including a plurality of carriages supported movably along a horizontal path, work hands each supported by one of the carriages vertically and horizontally movably with respect thereto, and a plurality of work supports fixed below the horizontal path, the learning method comprising the steps of:

choosing a reference carriage from the carriages and a reference work support from the work supports;

performing a first learning process for finding a first amount of horizontal two-dimensional positioning for the work hand of die reference carriage with respect to each of the work supports;

storing the first amounts of positioning with respect to the work supports as unified amounts of positioning in the carriages other than the reference carriage;

performing a second learning process for finding a second amount of horizontal two-dimensional positioning for the work hand of each carriage with respect to the reference work support performing a comparison operation of the unified and second amounts of positioning for each of the carriages to find an amount of correction exclusive to each of the carriages and common to all of the work supports; and correcting the unified amount of positioning for each of the work supports with the amount of correction.

* * * * *